United States Patent
Ellis et al.

(10) Patent No.: US 12,538,148 B2
(45) Date of Patent: Jan. 27, 2026

(54) SYSTEMS AND METHODS FOR NETWORK PERFORMANCE MONITORING

(71) Applicant: Apple Inc., Cupertino, CA (US)

(72) Inventors: Daniel P Ellis, West Pittston, PA (US); Daniel V Chioreanu, Royal Oak, MI (US); Gino Joachim L Ledesma, Cupertino, CA (US); Jarett M Morrow, San Francisco, CA (US)

(73) Assignee: Apple Inc., Cupertion, CA (US)

( * ) Notice: Subject to any disclaimer, the term of this patent is extended or adjusted under 35 U.S.C. 154(b) by 764 days.

(21) Appl. No.: 17/880,524

(22) Filed: Aug. 3, 2022

(65) Prior Publication Data
US 2024/0049012 A1 Feb. 8, 2024

(51) Int. Cl.
*H04W 24/08* (2009.01)
*H04W 24/04* (2009.01)
*H04W 72/23* (2023.01)

(52) U.S. Cl.
CPC ........... *H04W 24/08* (2013.01); *H04W 24/04* (2013.01); *H04W 72/23* (2023.01)

(58) Field of Classification Search
CPC .... H04W 24/08; H04W 24/04; H04W 72/042
See application file for complete search history.

(56) References Cited

U.S. PATENT DOCUMENTS

| | | | |
|---|---|---|---|
| 7,149,533 B2 | 12/2006 | Laird et al. | |
| 7,466,986 B2 | 12/2008 | Halcrow et al. | |
| 7,532,898 B2 | 5/2009 | Halcrow et al. | |
| 8,103,445 B2 | 1/2012 | Smith et al. | |
| 8,665,847 B2 | 3/2014 | Holostov et al. | |
| 8,930,458 B2 | 1/2015 | Lewis | |
| 10,181,896 B1 * | 1/2019 | Swift | H04B 7/18519 |
| 11,985,618 B2 * | 5/2024 | Narasimha | H04W 74/0833 |
| 12,010,614 B2 * | 6/2024 | Sadique | H04W 60/04 |
| 12,081,311 B1 * | 9/2024 | Talakoub | H04B 7/18513 |
| 12,200,556 B2 * | 1/2025 | Xu | H04B 7/18541 |
| 2009/0005061 A1 | 1/2009 | Ward et al. | |

(Continued)

OTHER PUBLICATIONS

U.S. Appl. No. 17/483,451, filed Sep. 23, 2021.

(Continued)

*Primary Examiner* — Parth Patel
(74) *Attorney, Agent, or Firm* — Treyz Law Group, P.C.; Michael H. Lyons

(57) ABSTRACT

A communications system may include user equipment (UE) devices, communications satellites, gateways, a satellite communications (satcom) network, and network performance monitoring devices. The monitoring devices may generate forward link signal information associated with forward link signals received from the satellites and may generate reverse link packets transmitted to the gateways via the satellites. The monitoring devices and the gateways may generate reverse link signal information associated with the reverse link packets. The satcom network may identify differences between the first and second reverse link signal information or between the forward link signal information and predicted forward link signal information for the monitoring devices. When the differences exceed a threshold value, the satcom network may generate and transmit error information used to diagnose, debug, and/or repair the potential errors in the constellation or gateways.

20 Claims, 12 Drawing Sheets

(56) References Cited

U.S. PATENT DOCUMENTS

| | | | |
|---|---|---|---|
| 2010/0056192 A1* | 3/2010 | Lachman | H04B 1/525 |
| | | | 455/501 |
| 2018/0145744 A1* | 5/2018 | Petranovich | H04B 7/18515 |
| 2019/0190837 A1* | 6/2019 | Wright | H04L 47/22 |
| 2019/0297506 A1* | 9/2019 | Shoshan | H04W 4/90 |
| 2019/0342147 A1* | 11/2019 | O'Reirdan | H04L 41/0668 |
| 2020/0028572 A1* | 1/2020 | Gaske | H04W 64/00 |
| 2020/0259250 A1* | 8/2020 | Diamond | H01Q 1/42 |
| 2022/0022077 A1 | 1/2022 | Maganti et al. | |
| 2022/0360320 A1* | 11/2022 | Miao | H04W 56/0035 |
| 2022/0386200 A1* | 12/2022 | Wang | H04W 36/362 |
| 2023/0344557 A1* | 10/2023 | Khoshkholgh Dashtaki | |
| | | | H04L 1/1812 |
| 2024/0049012 A1* | 2/2024 | Ellis | H04W 24/04 |
| 2024/0224211 A1* | 7/2024 | Falkenberg | H04W 56/0045 |
| 2024/0259799 A1* | 8/2024 | Elshafie | H04W 12/121 |
| 2025/0048443 A1* | 2/2025 | Khoshkholgh Dashtaki | |
| | | | H04W 74/0833 |

OTHER PUBLICATIONS

U.S. Appl. No. 17/483,460, filed Sep. 23, 2021.
U.S. Appl. No. 17/483,665, filed Sep. 23, 2021.
U.S. Appl. No. 17/483,669, filed Sep. 23, 2021.

* cited by examiner

SYSTEMS AND METHODS FOR NETWORK PERFORMANCE MONITORING

FIELD

This relates generally to wireless communications, including wireless communications via one or more satellites.

BACKGROUND

Communications systems are used to convey data between user equipment devices. Some communications systems include satellites that wirelessly convey data between user equipment devices and gateways. Each satellite provides wireless network access to the user equipment devices located within a corresponding coverage area on Earth.

It can be challenging to ensure that wireless network access provided to user equipment by satellites and gateways exhibits satisfactory levels of performance over time.

SUMMARY

A communications system may include user equipment (UE) devices, a constellation of communications satellites, gateways, and a terrestrial network. The terrestrial network may include a satellite communications (satcom) network. The gateways may transmit forward link data in forward link signals to UE devices via the constellation. The UE devices may transmit reverse link data in reverse link signals to the gateways via the constellation. The gateways may forward the reverse link data to the satcom network. The satcom network may forward the reverse link data to corresponding destination end hosts of the terrestrial network. The satcom network may schedule forward link communications for the gateways.

The communications system may include one or more network performance monitoring devices. The monitoring devices may be distributed across different locations across Earth. The monitoring devices may receive the forward link signals from the constellation. The monitoring devices may generate forward link signal information associated with the received forward link signals. The monitoring devices may also generate reverse link packets using unique identifiers that distinguish the monitoring devices from the UE devices. The monitoring devices may transmit the reverse link packets in reverse link signals transmitted to the gateways via the constellation. The monitoring devices may generate first reverse link signal information associated with the transmitted reverse link packets. The gateways may receive the reverse link packets from the constellation. The gateways may generate second reverse link signal information from the received reverse link packets. The monitoring devices may transmit the forward link signal information and the first reverse link signal information to the satcom network via the terrestrial network. The gateways may transmit the second reverse link signal information to the satcom network via the terrestrial network.

The satcom network may identify differences between the first and second reverse link signal information. The satcom network may also predict forward link signal information that would be generated at the monitoring devices based on a communications schedule for the gateways, the known positions of the satellites in the constellation, the known positions of the monitoring devices, and/or other properties. The satcom network may identify differences between the predicted forward link signal information and the forward link signal information generated by the monitoring devices. When the differences exceed a threshold value, the satcom network may generate error information. The error information may include potential errors identified by the satcom network based on the differences. The error information may include one or more potential locations or sources of the errors in the constellation and/or the gateways as identified by the satcom network based on the differences. If desired, the error information may include adjustment commands for the constellation and/or the gateways to mitigate the potential errors. The satcom network may transmit the error information to the gateways, a network operations center, or other entities to notify, diagnose, debug, and/or repair the identified potential errors.

DETAILED DESCRIPTION

Figure 1:
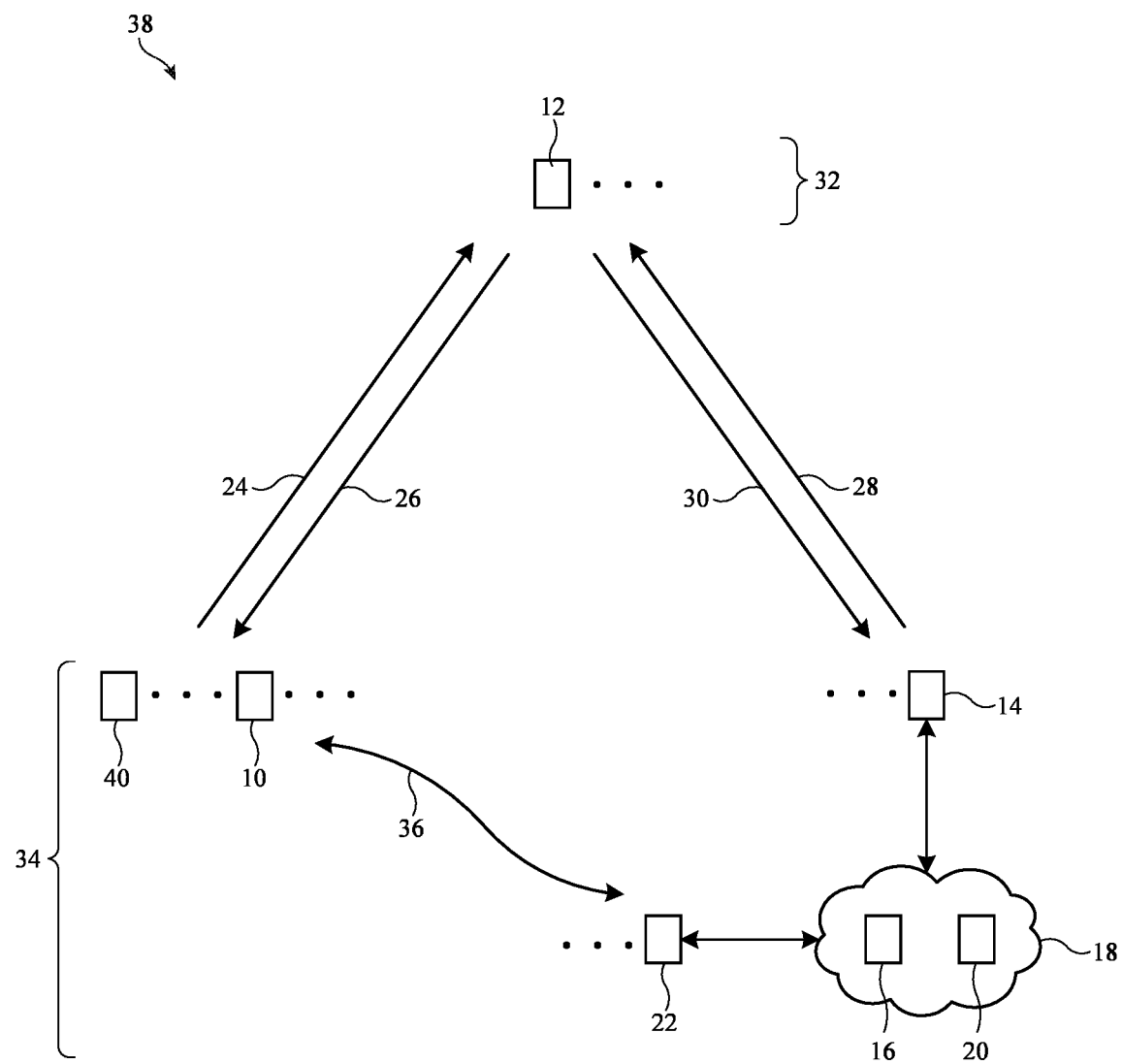
FIG. 1 is a diagram of an illustrative communications system having user equipment devices that communicate with gateways via a constellation of communications satellites and having network performance monitoring devices in accordance with some embodiments.

FIG. 1 is a diagram of an illustrative communications system 38. Communications system 38 (sometimes referred to herein as communications network 38, network 38, system 38, satellite communications system 38, or satellite communications network 38) may include a ground-based (terrestrial) gateway system that includes one or more gateways 14 and one or more user equipment (UE) devices 10. Gateways 14 and UE devices 10 may form a part of a terrestrial network 34 on Earth. Terrestrial network 34 may include terrestrial-based wireless communications equipment 22 and network portion 18. Terrestrial-based wireless communications equipment 22 may include one or more wireless base stations (e.g., for implementing a cellular telephone network) and/or wireless access points (e.g., for implementing a wireless local area network).

Communications system 38 may also include a constellation 32 of one or more communications satellites 12 (sometimes referred to herein simply as satellites 12). Constellation 32 may sometimes be referred to herein as satellite constellation 32 or space network 32. Communications satellites 12 are located in space (e.g., in orbit above Earth). While communications system 38 may include any desired number of gateways 14, any desired number of communications satellites 12, and any desired number of UE devices 10, only a single gateway 14, a single communications satellite 12, and a single UE device 10 are illustrated in FIG. 1 for the sake of clarity. Each gateway 14 in communications system 38 may be located at a different respective geographic location on Earth (e.g., across different regions, states, provinces, countries, continents, etc.).

Network portion 18 may be communicably coupled to terrestrial-based wireless communications equipment 22 and each of the gateways 14 in communications system 38. Gateway (GW) 14 may include a satellite network ground station and may therefore sometimes also be referred to as ground station (GS) 14 or satellite network ground station 14. Each gateway 14 may include one or more antennas (e.g., electronically and/or mechanically adjustable antennas), modems, transceivers, amplifiers, beam forming circuitry, control circuitry (e.g., one or more processors, storage circuitry, etc.) and other components that are used to convey communications data. The components of each gateway 14 may, for example, be disposed at a respective geographic location (e.g., within the same computer, server, data center, building, etc.). Gateways 14 may convey communications data between terrestrial network 34 and UE devices 10 via satellite constellation 32.

Network portion 18 may include any desired number of network nodes, terminals, and/or end hosts that are communicably coupled together using communications paths that include wired and/or wireless links. The wired links may include cables (e.g., ethernet cables, optical fibers or other optical cables that convey signals using light, telephone cables, etc.). Network portion 18 may include one or more relay networks, mesh networks, local area networks (LANs), wireless local area networks (WLANs), ring networks (e.g., optical rings), cloud networks, virtual/logical networks, the Internet, combinations of these, and/or any other desired network nodes coupled together using any desired network topologies (e.g., on Earth). The network nodes, terminals, and/or end hosts may include network switches, network routers, optical add-drop multiplexers, other multiplexers, repeaters, modems, servers, network cards, wireless access points, wireless base stations, UE devices such as UE devices 10, and/or any other desired network components. The network nodes in network portion 18 may include physical components such as electronic devices, servers, computers, user equipment, etc., and/or may include virtual components that are logically defined in software and that are distributed across (over) two or more underlying physical devices (e.g., in a cloud network configuration).

Network portion 18 may include one or more satellite network operations centers such as network operations center (NOC) 16. NOC 16 may control the operation of gateways 14 in communicating with satellite constellation 32. NOC 16 may also control the operation of the satellites 12 in satellite constellation 32. For example, NOC 16 may convey control commands via gateways 14 that control positioning operations (e.g., orbit adjustments), sensing operations (e.g., thermal information gathered using one or more thermal sensors), and/or any other desired operations performed in space by satellites 12. NOC 16, gateways 14, and satellite constellation 32 may be operated or managed by a corresponding satellite constellation operator.

Communications system 38 may also include a satellite communications (satcom) network service provider (e.g., a satcom network carrier or operator) for controlling wireless communications between UE devices 10 and terrestrial network 34 via satellite constellation 32. The satcom network service provider may be a different entity than the satellite constellation operator that controls/operates NOC 16, gateways 14, and satellite constellation 32 or, if desired, may be the same entity as the satellite constellation operator. Terrestrial-based wireless communications equipment 22 in terrestrial network 34 may be operated by one or more terrestrial network carriers or service providers. The terrestrial network carriers or service providers may be different entities than the satcom network service provider or, if desired, may be the same entity as the satcom network service provider.

Gateway 14 may control the operations of satellite constellation 32 over corresponding radio-frequency communications links. Satellite constellation 32 may include any desired number of satellites (e.g., two satellites, four satellites, ten satellites, dozens of satellites, hundreds of satellites, thousands of satellites, etc.), one of which is shown in FIG. 1. If desired, two or more of the satellites 12 in satellite constellation 32 may convey radio-frequency signals between each other using satellite-to-satellite (e.g., relay) links.

Satellites 12 may include low earth orbit (LEO) satellites at orbital altitudes of less than around 8,000 km (e.g., satellites in low earth orbits, inclined low earth orbits, low earth circular orbits, etc.), geosynchronous satellites at orbital altitudes of greater than around 30,000 km (e.g., satellite in geosynchronous orbits), medium earth orbit (MEO) satellites at orbital altitudes between around 8,000 km and 30,000 km (e.g., satellite in medium earth orbits), sun synchronous satellites (e.g., satellites in sun synchronous orbits), satellites in tundra orbits, satellites in Molniya orbits, satellites in polar orbits, and/or satellites in any other desired orbits around Earth. Communications system 38 may include satellites in any desired combination of orbits or orbit types.

Each satellite 12 may communicate with one or more UE devices 10 on Earth using one or more radio-frequency communications links (e.g., satellite-to-user equipment links). Satellites 12 may also communicate with gateways 14 on Earth using radio-frequency communications links (e.g., satellite-to-gateway links). Radio-frequency signals may be conveyed between UE devices 10 and satellites 12 and between satellites 12 and gateways 14 in IEEE bands such as the IEEE C band (4-8 GHz), S band (2-4 GHz), L band (1-2 GHz), X band (8-12 GHz), W band (75-110 GHz), V band (40-75 GHz), K band (18-27 GHz), $K_a$ band (26.5-40 GHz), $K_u$ band (12-18 GHz), and/or any other desired satellite communications bands. If desired, different bands may be used for the satellite-to-user equipment links than for the satellite-to-gateway links.

Communications may be performed between gateways 14 and UE devices 10 in a forward (FWD) link direction and/or in a reverse (REV or RWD) link direction. In the forward link direction (sometimes referred to simply as the forward link), wireless data is conveyed from gateways 14 to UE device(s) 10 via satellite constellation 32. For example, a gateway 14 may transmit forward link data to one of the satellites 12 in satellite constellation 32 (e.g., using radio-frequency signals 28). Satellite 12 may transmit (e.g., relay) the forward link data received from gateway 14 to UE device(s) 10 (e.g., using radio-frequency signals 26). Radio-frequency signals 28 are conveyed in an uplink direction from gateway 14 to satellite 12 and may therefore sometimes be referred to herein as uplink (UL) signals 28, forward link UL signals 28, or forward link signals 28. Radio-frequency signals 26 are conveyed in a downlink direction from satellite 12 to UE device(s) 10 and may therefore sometimes be referred to herein as downlink (DL) signals 26, forward link DL signals 26, or forward link signals 26.

In the reverse link direction (sometimes referred to simply as the reverse link), wireless data is conveyed from UE device(s) 10 to gateways 14 via satellite constellation 32. For example, one of the UE devices 10 may transmit reverse link data to satellite 12 using radio-frequency signals 24 and satellite 12 may transmit (e.g., relay) the reverse link data received from UE device 10 to a corresponding gateway 14 using radio-frequency signals 30. Radio-frequency signals 24 are conveyed in an uplink direction from UE device 10 to satellite 12 and may therefore sometimes be referred to herein as uplink (UL) signals 24, reverse link UL signals 24, or reverse link signals 24. Radio-frequency signals 30 are conveyed in a downlink direction from satellite 12 to gateway 14 and may therefore sometimes be referred to herein as downlink (DL) signals 30, reverse link DL signals 30, or reverse link signals 30. Gateway 14 may forward wireless data between UE device(s) 10 and network portion 18. Network portion 18 may forward the wireless data to any desired network nodes or terminals of terrestrial network 34.

If desired, UE devices 10 may also convey radio-frequency signals with terrestrial-based wireless communications equipment 22 over terrestrial network wireless communication links 36 when available. UE devices 10 may sometimes be referred to herein as being "online" or "on-grid" when the UE devices are within range of terrestrial-based wireless communications equipment 22 and when terrestrial-based wireless communications equipment 22 provides access (e.g., communications resources) to network portion 18 for the UE devices. When the UE devices are online, the UE devices may communicate with other network nodes or terminals in network portion 18 via terrestrial network wireless communications links 36. Conversely, UE devices 10 may sometimes be referred to herein as being "offline" or "off-grid" when the UE devices are out of range of terrestrial-based wireless communications equipment 22 or when terrestrial-based wireless communications equipment 22 does not provide access to network portion 18 for the UE devices (e.g., when terrestrial-based wireless communications equipment 22 is disabled due to a power outage, natural disaster, traffic surge, or emergency, when terrestrial-based wireless communications equipment 22 denies access to network portion 18 for the UE devices, when terrestrial-based wireless communications equipment 22 is overloaded with traffic, etc.). If desired, UE devices 10 may include separate antennas for handling communications over the satellite-to-user equipment link and one or more terrestrial network wireless communication links 36 or UE devices 10 may include a single antenna that handles both the satellite-to-user equipment link and the terrestrial network wireless communications links. The terrestrial network wireless communications links may be, for example, cellular telephone links (e.g., links maintained using a cellular telephone communications protocol such as a 4G Long Term Evolution (LTE) protocol, a 3G protocol, a 3GPP Fifth Generation (5G) New Radio (NR) protocol, etc.), wireless local area network links (e.g., Wi-Fi® and/or Bluetooth links), etc.

The wireless data conveyed in DL signals 26 may sometimes be referred to herein as DL data, forward link DL data, or forward link data. UL signals 28 may also convey the forward link data (e.g., forward link data that is routed by satellite 12 to UE device(s) 10 in DL signals 26). The wireless data conveyed in UL signals 24 may sometimes be referred to herein as UL data, reverse link UL data, or reverse link data. The reverse link data may be generated by UE device(s) 10. DL signals 30 may also convey the reverse link data. The forward link data may be generated by any desired network nodes or terminals of terrestrial network 34. The forward link data and the reverse link data may include text data such as email messages, text messages, web browser data, an emergency or SOS message, a location message identifying the location of UE device(s) 10, or other text-based data, audio data such as voice data (e.g., for a bi-directional satellite voice call) or other audio data (e.g., streaming satellite radio data), video data (e.g., for a bi-directional satellite video call or to stream video data transmitted by gateway 14 at UE device(s) 10), cloud network synchronization data, data generated or used by software applications running on UE device(s) 10, and/or any other desired data. UE devices 10 may only receive forward link data, may only transmit reverse link data, or may both transmit reverse link data and receive forward link data. Each satellite 12 may communicate with the UE devices 10 located within its coverage area (e.g., UE devices 10 located within cells on Earth that overlap the signal beam(s) producible by the satellite).

The satcom network service provider for communications system 38 may operate, control, and/or manage a satcom control network such as satcom network region 20 in network portion 18. Satcom network region 20 (sometimes referred to herein as satcom controller 20, satcom network 20, or satcom service provider equipment 20) may be implemented on one or more network nodes and/or terminals of network portion 18 (e.g., one or more servers or other end hosts). In some implementations, satcom network region 20 may be formed from a cloud computing network distributed over multiple underlying physical network nodes and/or terminals distributed across one or more geographic regions. Satcom network region 20 may therefore sometimes also be referred to herein as satcom cloud region 20, satcom cloud network 20, or satcom cloud network region 20.

Satcom network region 20 may control and coordinate wireless communications between terminals of terrestrial network 34 and UE devices 10 via satellite constellation 32. For example, gateways 14 may receive reverse link data from UE devices 10 via satellite constellation 32 and may route the reverse link data to satcom network region 20. Satcom network region 20 may perform any desired processing operations on the reverse link data. For example, satcom network region 20 may identify destinations for the reverse link data and may forward the reverse link data to the identified destinations. Satcom network region 20 may also receive forward link data for transmission to UE devices 10 from one or more terminals (end hosts) of terrestrial network 34 (e.g., network portion 18). Satcom network region 20 may process the forward link data to schedule the forward link data for transmission to UE devices 10 via satellite constellation 32. Satcom network region 20 may schedule the forward link data for transmission to UE devices 10 by generating forward link traffic grants for each of the UE devices that are to receive forward link data. Satcom network region 20 may provide the forward link data and the forward link traffic grants to gateways 14. Gateways 14 may transmit the forward link data to UE devices 10 via satellite constellation 32 according to the forward link traffic grants (e.g., according to a forward link communications schedule that implements the forward link traffic grants).

The network performance of communications system 38 in conveying wireless data between UE device(s) 10 and gateway(s) 14 may vary over time. This variation can be due to variations in the performance of one or more components on UE device(s) 10, satellite constellation 32, and/or gateway(s) 14, as well as changes in the radio-frequency propagation conditions between UE device(s) 10 and satellite constellation 32 and/or between satellite constellation 32 and gateway(s) 14 (e.g., due to changes in weather or other radio-frequency obstacles). It can be particularly difficult to monitor network performance in communications system 38 given that satellite constellation 32 is located in space and is generally unreachable for physical repair or in-person diagnostics, satellites 12 and UE devices 10 frequently or constantly move relative to Earth and each other over time, satellite constellation 32 might be operated by a satellite constellation operator that is different from the satcom network service provider, and different users may have/operate UE devices 10 having different hardware capabilities or conditions.

It would therefore be desirable for the satcom network service provider to be able to reliably monitor the (wireless) performance of communications system 38 in conveying wireless data via satellite constellation 32 in real-time. This may, for example, allow the satcom network service provider to identify errors or problems in the conveyance of wireless data between gateway(s) 14 and UE device(s) 10 via satellite constellation 32, to provide information identifying the errors or problems to an operator of gateway(s) 14 and/or NOC 16, to perform adjustments to one or more components in communications system 38 to correct the errors or problems, and/or to ensure that NOC 16 or the satellite constellation operator is in compliance with any guarantee, contract, or agreement (e.g., a Service Level Agreement (SLA)) in place with the satcom network service provider regarding wireless communications capabilities that are to be provided to UE device(s) 10 via satellite constellation 32.

Communications system 38 may therefore include one or more network performance monitoring devices 40 that monitor the performance of communications system 38 in conveying wireless data via satellite constellation 32 in real-time. Network performance monitoring device(s) 40 may be associated with (e.g., owned, operated, and/or controlled by) the satcom network service provider associated with satcom network region 20. Network performance monitoring devices 40 may be distributed across different locations on Earth (e.g., in different regions, states, countries, cities, or areas that are to be provided with communications capacity by satellite constellation 32).

Network performance monitoring device(s) 40 may help to monitor the network performance of satellite constellation 32 and/or gateway(s) 14 in conveying wireless data for UE device(s) 10 based on forward link signals and/or reverse link signals conveyed by satellite constellation 32. Network performance monitoring device(s) 40 may, for example, receive the DL signals 26 transmitted to UE device(s) 10 by satellite constellation 32 (e.g., forward link data in DL signals 26) and/or may transmit some of the UL signals 24 to satellite constellation 32 (e.g., reverse link data in UL signals 24). Network performance monitoring device(s) 40 may transmit information about the received forward link data (which may include the received forward link data itself) and/or information about the transmitted reverse link data (which may include the transmitted reverse link data itself) to satcom network region 20 (e.g., via the terrestrial network). While conveying wireless data with UE device(s) 10 via satellite constellation 32, gateway(s) 14 may also transmit information about reverse link data received in DL signals 30 (which may include the received reverse link data itself) to satcom network region 20 (e.g., via the terrestrial network).

Satcom network region 20 may process the information about the forward link data received by network performance monitoring device(s) 40, the information about the reverse link data transmitted by network performance monitoring device(s) 40, and/or the information about the reverse link data received by gateway(s) 14 to monitor (e.g., detect, sense, identify, characterize, and/or analyze) the performance of communications system 38 in conveying wireless data between gateway(s) 14 and UE device(s) 10 via satellite constellation 32. This may include, for example, identifying (e.g., detecting) errors, problems, or other non-idealities in satellite constellation 32 and/or gateway(s) 14 that limit, deteriorate, or otherwise impact the performance of communications system 38 in conveying wireless data between gateway(s) 14 and UE device(s) 10 via satellite constellation 32. This may, if desired, include identifying one or more points in communications system 38 that produced or are likely to have produced the identified errors, problems, or other non-idealities and/or may include transmitting information (e.g., reports) to NOC 16 and/or an operator of gateway(s) 14 identifying the errors, problems, or other non-idealities and/or the points in communications system 38 that produced or are likely to have produced the identified errors. This monitoring may also include, if desired, generating commands or control signals that instruct NOC 16, gateway(s) 14, and/or satellite constellation 32 to perform one or more adjustments in conveying wireless data with UE device(s) 10.

UE device 10 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

Figure 2:
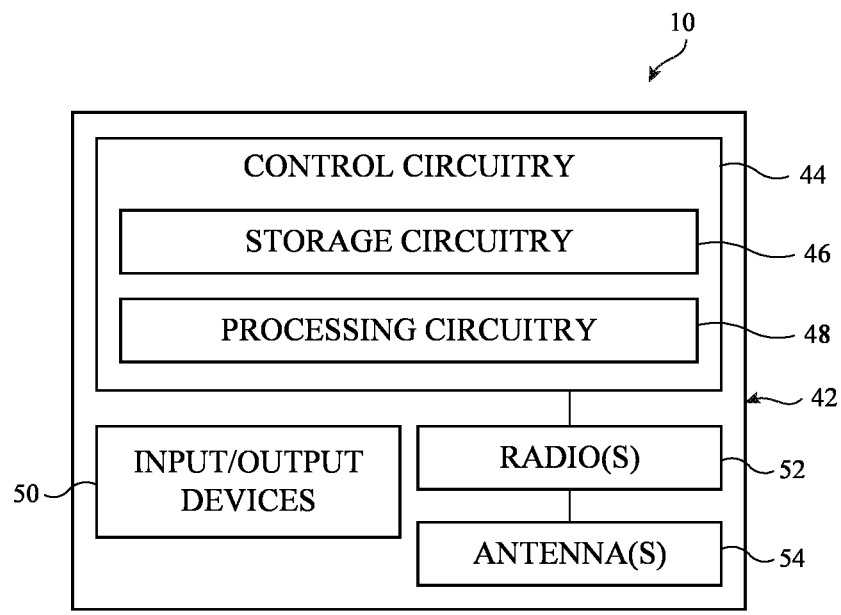
FIG. 2 is a schematic diagram of an illustrative user equipment device in accordance with some embodiments.

As shown in FIG. 2, UE device 10 may include components located on or within an electronic device housing such as housing 42. Housing 42, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 42 may be formed from dielectric or other low-conductivity material (e.g., glass, ceramic, plastic, sapphire, etc.). In other situations, housing 42 or at least some of the structures that make up housing 42 may be formed from metal elements.

UE device 10 may include control circuitry 44. Control circuitry 44 may include storage such as storage circuitry 46. Storage circuitry 46 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 46 may include storage that is integrated within UE device 10 and/or removable storage media.

Control circuitry 44 may include processing circuitry such as processing circuitry 48. Processing circuitry 48 may be used to control the operation of UE device 10. Processing circuitry 48 may include on one or more processors (e.g., microprocessors, microcontrollers, digital signal processors, host processors, baseband processor integrated circuits, application specific integrated circuits, central processing units (CPUs), graphics processing units (GPUs), etc.). Control circuitry 44 may be configured to perform operations in device 10 using hardware (e.g., dedicated hardware or circuitry), firmware, and/or software. Software code for performing operations on UE device 10 may be stored on storage circuitry 46 (e.g., storage circuitry 46 may include non-transitory (tangible) computer readable storage media that stores the software code). The software code may sometimes be referred to as program instructions, software, data, instructions, or code. Software code stored on storage circuitry 46 may be executed by processing circuitry 48.

Control circuitry 44 may be used to run software on UE device 10 such as satellite navigation applications, internet browsing applications, voice-over-internet-protocol (VOIP) telephone call applications, email applications, media playback applications, operating system functions, etc. To support interactions with external equipment, control circuitry 44 may be used in implementing communications protocols. Communications protocols that may be implemented using control circuitry 44 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), satellite communications protocols, or any other desired communications protocols. Each communications protocol may be associated with a corresponding radio access technology (RAT) that specifies the physical connection methodology used in implementing the protocol.

UE device 10 may store satellite information associated with one or more of the satellites 12 in satellite constellation 32 on storage circuitry 46. The satellite information may include a satellite almanac identifying the position (e.g., orbit information, elevation information, altitude information, inclination information, eccentricity information, orbital period information, trajectory information, right ascension information, declination information, ground track information, etc.) and/or the velocity of satellites 12 (e.g., relative to the surface of Earth). This information may include a two-line element (TLE), for example. The TLE may identify (include) information about the orbital motion of one or more of the satellites 12 in satellite constellation 32 (e.g., satellite epoch, first and/or second derivatives of motion, drag terms, etc.). The TLE may, for example, be used by control circuitry 44 as an input for calculating, predicting, or identifying the location of satellites 12 at a given point in time. The TLE may be in the format of a text file having two lines or columns that include the set of elements forming the TLE, for example.

UE device 10 may also include wireless circuitry to support wireless communications. The wireless circuitry may include one or more antennas 54 and one or more radios 52. Each radio 52 may include circuitry that operates on signals at baseband frequencies (e.g., baseband processor circuitry), signal generator circuitry, modulation/demodulation circuitry (e.g., one or more modems), radio-frequency transceiver circuitry (e.g., radio-frequency transmitter circuitry, radio-frequency receiver circuitry, mixer circuitry for downconverting radio-frequency signals to baseband frequencies or intermediate frequencies between radio and baseband frequencies and/or for upconverting signals at baseband or intermediate frequencies to radio-frequencies, etc.), amplifier circuitry (e.g., one or more power amplifiers and/or one or more low-noise amplifiers (LNAs)), analog-to-digital converter (ADC) circuitry, digital-to-analog converter (DAC) circuitry, control paths, power supply paths, signal paths (e.g., radio-frequency transmission lines, intermediate frequency transmission lines, baseband signal lines, etc.), switching circuitry, filter circuitry, and/or any other circuitry for transmitting and/or receiving radio-frequency signals using antenna(s) 54. The components of each radio 52 may be mounted onto a respective substrate or integrated into a respective integrated circuit, chip, package, or system-on-chip (SOC). If desired, the components of multiple radios 52 may share a single substrate, integrated circuit, chip, package, or SOC.

Antenna(s) 54 may be formed using any desired antenna structures. For example, antenna(s) 54 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. If desired, one or more antennas 54 may include antenna resonating elements formed from conductive portions of housing 42 (e.g., peripheral conductive housing structures extending around a periphery of a display on UE device 10). Filter circuitry, switching circuitry, impedance matching circuitry, and/or other antenna tuning components may be adjusted to adjust the frequency response and wireless performance of antenna(s) 54 over time. If desired, multiple antennas 54 may be implemented as a phased array antenna (e.g., where each antenna forms a radiator or antenna element of the phased array antenna, which is sometimes also referred to as a phased antenna array). In these scenarios, the phased array antenna may convey radio-frequency signals within a signal beam. The phases and/or magnitudes of each radiator in the phased array antenna may be adjusted so the radio-frequency signals for each radiator constructively and destructively interfere to steer or orient the signal beam in a particular pointing direction (e.g., a direction of peak signal gain). The signal beam may be adjusted or steered over time.

Transceiver circuitry in radios 52 may convey radio-frequency signals using one or more antennas 54 (e.g., antenna(s) 54 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antenna(s) 54 may transmit the radio-frequency signals by radiating the radio-frequency signals into free space (or to free space through intervening device structures such as a dielectric cover layer). Antenna(s) 54 may additionally or alternatively receive the radio-frequency signals from free space (e.g., through intervening devices structures such as a dielectric cover layer). The transmission and reception of radio-frequency signals by antenna(s) 54 each involve the excitation or resonance of antenna currents on an antenna resonating element in the antenna by the radio-frequency signals within the frequency band(s) of operation of the antenna.

Each radio 52 may be coupled to one or more antennas 54 over one or more radio-frequency transmission lines. The radio-frequency transmission lines may include coaxial cables, microstrip transmission lines, stripline transmission lines, edge-coupled microstrip transmission lines, edge-coupled stripline transmission lines, transmission lines formed from combinations of transmission lines of these types, etc. The radio-frequency transmission lines may be integrated into rigid and/or flexible printed circuit boards if desired. One or more of the radio-frequency lines may be shared between radios 52 if desired. Radio-frequency front end (RFFE) modules may be interposed on one or more of the radio-frequency transmission lines. The radio-frequency front end modules may include substrates, integrated circuits, chips, or packages that are separate from radios 52 and may include filter circuitry, switching circuitry, amplifier circuitry, impedance matching circuitry, radio-frequency coupler circuitry, and/or any other desired radio-frequency circuitry for operating on the radio-frequency signals conveyed over the radio-frequency transmission lines.

Radios 52 may use antenna(s) 54 to transmit and/or receive radio-frequency signals within different frequency bands at radio frequencies (sometimes referred to herein as communications bands or simply as a "bands"). The frequency bands handled by radios 52 may include satellite communications bands (e.g., the C band, S band, L band, X band, W band, V band, K band, $K_a$ band, $K_u$ band, etc.), wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, 6G bands, etc.), other centimeter or millimeter wave frequency bands between 10-300 GHz, near-field communications (NFC) frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

While control circuitry 44 is shown separately from radios 52 in the example of FIG. 2 for the sake of clarity, radios 52 may include processing circuitry that forms a part of processing circuitry 48 and/or storage circuitry that forms a part of storage circuitry 46 of control circuitry 44 (e.g., portions of control circuitry 44 may be implemented on radios 52). As an example, control circuitry 44 may include baseband circuitry or other control components that form a part of radios 52. The baseband circuitry may, for example, access a communication protocol stack on control circuitry 44 (e.g., storage circuitry 46) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

UE device 10 may include input-output devices 50. Input-output devices 50 may be used to allow data to be supplied to UE device 10 and to allow data to be provided from UE device 10 to external devices. Input-output devices 50 may include user interface devices, data port devices, and other input-output components. For example, input-output devices 50 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 50 may be peripherals that are coupled to a main processing unit or other portion of device 10 via a wired or wireless link). UE device 10 may be owned and/or operated by an end user.

Figure 3:
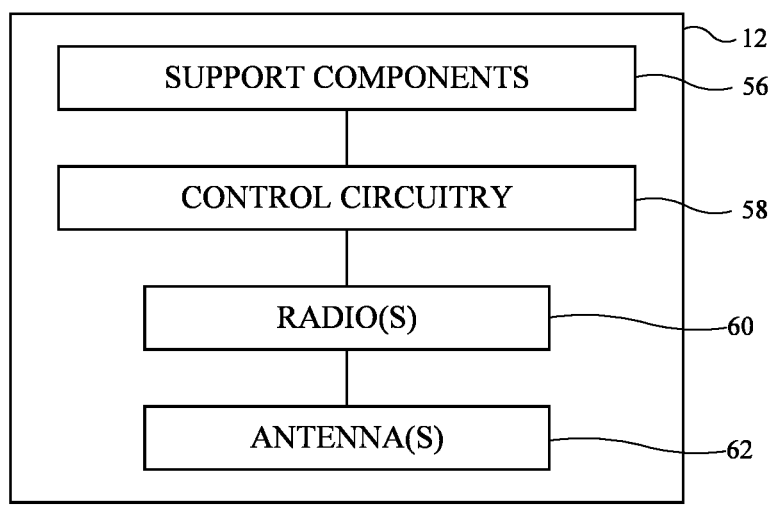
FIG. 3 is a schematic diagram of an illustrative communications satellite in accordance with some embodiments.

FIG. 3 is a diagram of an illustrative satellite 12 in communications system 38. As shown in FIG. 3, satellite 12 may include satellite support components 56. Support components 56 may include batteries, solar panels, sensors (e.g., accelerometers, gyroscopes, temperature sensors, light sensors, etc.), guidance systems, propulsion systems, and/or any other desired components associated with supporting satellite 12 in orbit above Earth.

Satellite 12 may include control circuitry 58. Control circuitry 58 may be used in controlling the operations of satellite 12. Control circuitry 58 may include processing circuitry such as processing circuitry 48 of FIG. 2 and may include storage circuitry such as storage circuitry 46 of FIG. 2. Control circuitry 58 may also control support components 56 to adjust the trajectory or position of satellite 12 in space.

Satellite 12 may include antennas 62 and one or more radios 60. Radios 60 may use antennas 62 to transmit DL signals 26 and DL signals 30 and to receive UL signals 24 and UL signals 28 of FIG. 1 (e.g., in one or more satellite communications bands). Radios 60 may include transceivers, modems, integrated circuit chips, application specific integrated circuits, filters, switches, up-converter circuitry, down-converter circuitry, analog-to-digital converter circuitry, digital-to-analog converter circuitry, amplifier circuitry (e.g., multiport amplifiers), beam steering circuitry, etc.

Antennas 62 may include any desired antenna structures (e.g., patch antenna structures, dipole antenna structures, monopole antenna structures, waveguide antenna structures, Yagi antenna structures, inverted-F antenna structures, cavity-backed antenna structures, combinations of these, etc.). In one suitable arrangement, antennas 62 may include one or more phased array antennas. Each phased array antenna may include beam forming circuitry having a phase and magnitude controller coupled to each antenna element in the phased array antenna. The phase and magnitude controllers may provide a desired phase and magnitude to the radio-frequency signals conveyed over the corresponding antenna element. The phases and magnitudes of each antenna element may be adjusted so that the radio-frequency signals conveyed by each of the antenna elements constructively and destructively interfere to produce a radio-frequency signal beam (e.g., a spot beam) in a desired pointing direction (e.g., an angular direction towards Earth at which the radio-frequency signal beam exhibits peak gain). Radio-frequency lenses may also be used to help guide the radio-frequency signal beam in a desired pointing direction. Each radio-frequency signal beam also exhibits a corresponding beam width. This allows each radio-frequency signal beam to cover a corresponding cell on Earth (e.g., a region on Earth overlapping the radio-frequency signal beam such that the radio-frequency signal beam exhibits a power greater than a minimum threshold value within that region/cell). Satellite 12 may convey radio-frequency signals over multiple concurrently-active signal beams if desired. If desired, satellite 12 may offload some or all of its beam forming operations to gateway 14.

If desired, radios 60 and antennas 62 may support communications using multiple polarizations. For example, radios 60 and antennas 62 may transmit and receive radio-frequency signals with a first polarization (e.g., a left-hand circular polarization (LHCP)) and may transmit and receive radio-frequency signals with a second polarization (e.g., a right-hand circular polarization (RHCP)). Antennas 62 may be able to produce a set of different signal beams at different beam pointing angles (e.g., where each beam overlaps a respective cell on Earth). The set of signal beams may include a first subset of signal beams that convey LHCP signals (e.g., LHCP signal beams) and a second subset of signal beams that convey RHCP signals (e.g., RHCP signal beams). The LHCP and RHCP signal beams may, for example, be produced using respective multiport power amplifiers (MPAs) on satellite 12. Each MPA may include a number of solid state power amplifiers (SSPAs) (e.g., each MPA may include one SSPA for each signal beam producible using that MPA). This may allow LHCP and RHCP signal beams to be active simultaneously. For example, if radios 60 and antennas 62 can produce 16 different signal beams, the 16 signal beams may include a first MPA having 8 SSPAs for producing 8 LHCP signal beams and may include a second MPA having 8 SSPAs for producing 8 RHCP signal beams. This is merely illustrative and, in general, satellite 12 may produce any desired number of signal beams having any desired polarizations.

Figure 4:
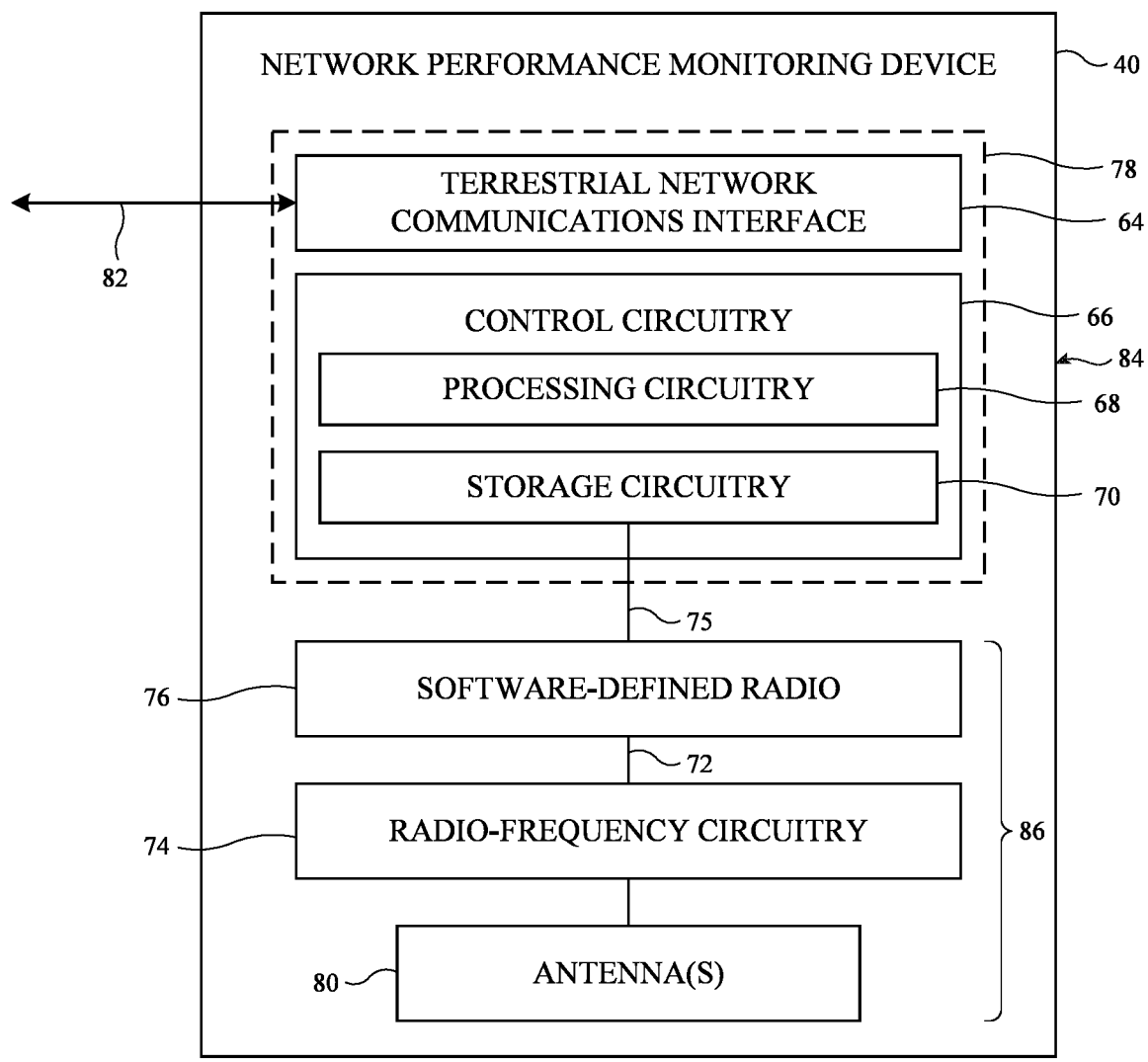
FIG. 4 is a schematic diagram of an illustrative network performance monitoring device in accordance with some embodiments.

FIG. 4 is a diagram of an illustrative network performance monitoring device 40 in communications system 38. Network performance monitoring device 40 may sometimes be referred to herein as network performance monitor 40, network performance monitoring equipment 40, monitor 40, performance monitor 40, network monitor 40, network device 40, electronic device 40, network diagnostic device 40, network monitoring device 40, SLA compliance monitoring device 40, monitoring device 40, or simply as device 40. Monitoring device 40 may include one or more electronic devices that are used in monitoring, tracking, assessing, identifying, and/or analyzing the performance (e.g., wireless or radio-frequency performance) of communications system 38 in conveying wireless data between UE device(s) 10 and gateway(s) 14 via satellite constellation 32.

As shown in FIG. 4, monitoring device 40 may be enclosed within a housing (enclosure) 84. Housing 84, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 84 may be formed from dielectric or other low-conductivity material (e.g., glass, ceramic, plastic, sapphire, etc.). In other situations, housing 84 or at least some of the structures that make up housing 84 may be formed from metal elements.

Monitoring device 40 may include control circuitry such as control circuitry 66. Control circuitry 66 may include storage such as storage circuitry 70. Storage circuitry 70 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 70 may include storage that is integrated within monitoring device 40 and/or removable storage media.

Control circuitry 66 may include processing circuitry such as processing circuitry 68. Processing circuitry 68 may be used to control the operation of monitoring device 40. Processing circuitry 68 may include one or more processors (e.g., microprocessors, microcontrollers, digital signal processors, host processors, baseband processor integrated circuits, application specific integrated circuits, central processing units (CPUs), graphics processing units (GPUs), etc.). Control circuitry 66 may be configured to perform operations in monitoring device 40 using hardware (e.g., dedicated hardware or circuitry), firmware, and/or software. Software code for performing operations on monitoring device 40 may be stored on storage circuitry 70 (e.g., storage circuitry 70 may include non-transitory (tangible) computer readable storage media that stores the software code). The software code may sometimes be referred to as program instructions, software, data, instructions, or code. Software code stored on storage circuitry 70 may be executed by processing circuitry 68.

Monitoring device 40 may include one or more communications interfaces such as terrestrial network communications interface 64. Terrestrial network communications interface 64 may allow monitoring device 40 to communicate with terrestrial network 34 (FIG. 1) via one or more communications links 82 (e.g., terrestrial communications link to network portion 18 of FIG. 1). Communications links 82 may include wired link and/or wireless links. Terrestrial network communications interface 64 may include one or more radios, one or more antennas, one or more data ports (e.g., Ethernet ports), cabling (e.g., coaxial cabling, Ethernet cabling, etc.) and/or any other desired equipment for communicating with terrestrial network 34 (e.g., without passing information through satellite constellation 32). If desired, terrestrial network communications interface 64 and/or control circuitry 66 may be integrated into a single device 78 within monitoring device 40. Device 78 may be a standalone device such as a desktop computer, laptop computer, cellular telephone, server, or other portable electronic device. Device 78 may be enclosed within a housing that is disposed within housing 84 if desired.

Monitoring device 40 may also include a space network communications interface 86 for communicating with gateway(s) 14 via satellite constellation 32. Space network communications interface 86 may include one or more radios. The radios may, if desired, include a software-defined radio such as software-defined radio (SDR) 76. SDR 76 may be implemented within device 78 or external to device 78 (as shown in the example of FIG. 4). SDR 76 may be coupled to control circuitry 66 over control path 75. Control path 75 may convey control signals and/or data between control circuitry 66 and SDR 76. SDR 76 is a radio that performs one or more functions of a hardware radio (e.g., mixing functions, amplification functions, modulation functions, demodulation functions, detection functions, synthesizer functions, filtering functions, etc.) using software (e.g., as executed by one or more processors such as processing circuitry 68 or other processing circuitry within SDR 76). SDR 76 may, for example, function similar to a modem that allows a computing device (e.g., device 78) to create radio-frequency energy to absorb/decode received radio-frequency energy via antenna(s) 80.

Space network communications interface 86 may also include radio-frequency hardware components such as radio-frequency circuitry 74 and one or more antennas 80. SDR 76 may be coupled to antenna(s) 80 over one or more radio-frequency transmission line path 72. Radio-frequency circuitry 74 may be disposed on radio-frequency transmission line path(s) 72 between SDR 76 and antenna(s) 80. SDR 76 may include one or more analog-to-digital converter (ADC) and/or one or more digital-to-analog converter (DAC) coupled to radio-frequency transmission line path(s) 72. Antenna(s) 80 may include any desired antennas (e.g., antennas such as antennas 54 of FIG. 2 or antennas 62 of FIG. 3). Two or more antennas 80 may be antenna elements of one or more phased array antennas if desired.

Control circuitry 66 may transmit control signals to SDR 76 that control/adjust one or more of the operations of SDR 76. The control signals may control SDR 76 to generate radio-frequency signals and to transmit the radio-frequency signals over radio-frequency transmission line path(s) 72, radio-frequency circuitry 74, and antenna(s) 80. The control signals may control SDR 76 to generate wireless data such as reverse link data that is conveyed using the radio-frequency signals (e.g., that is modulated onto the radio-frequency signals). Antenna(s) 80 may transmit the radio-frequency signals to satellite constellation 32 in IEEE bands such as the IEEE C band (4-8 GHz), S band (2-4 GHz), L band (1-2 GHz), X band (8-12 GHz), W band (75-110 GHz), V band (40-75 GHz), K band (18-27 GHz), $K_a$ band (26.5-40 GHz), $K_u$ band (12-18 GHz), and/or any other desired satellite communications bands (e.g., as reverse link signals or uplink signals 24 as shown in FIG. 1). Control circuitry 66 may also transmit the transmitted reverse link data and/or information about the transmitted reverse link data to satcom network region 20 via terrestrial network communications interface 64 and communication link(s) 82.

The wireless data may include reverse link data such as one or more reverse link data packets. The reverse link data may convey messages to satcom network region 20 via satellite constellation 32 and gateway(s) 14. The reverse link data may include a unique identifier associated with monitoring device 40. The unique identifier may identify that the reverse link data was transmitted by a network performance monitoring device rather than a UE device 10. If desired, the reverse link data may be encoded or encrypted based on (using) the unique identifier. Satcom network region 20 may have knowledge of the unique identifier (or a decryption key associated with the unique identifier). This may allow satcom network region 20 to identify that the reverse link data was transmitted by a network performance monitoring device rather than a UE device 10 and to decrypt the reverse link data. At the same time, this may shield other network nodes from decrypting the reverse link data or detecting that the reverse link data was transmitted by a network performance monitoring device (e.g., the reverse link data may be indistinguishable from reverse link data transmitted by a UE device 10 and/or may be unencryptable to network nodes other than (outside of) satcom network region 20). The reverse link data may be transmitted by monitoring device 40 to allow satcom network region 20 to monitor the network performance of satellite constellation 32 and/or gateway(s) 14.

Antenna(s) 80 may also receive forward link signals (e.g., DL signals 26 of FIG. 1) from satellite constellation 32. Antenna(s) 80 may pass the received forward link signals to SDR 76 via radio-frequency transmission line(s) 72 and radio-frequency circuitry 74. SDR 76 may demodulate the received signals to obtain (receive) wireless data from the received radio-frequency signals. The received wireless data may include forward link data. SDR 76 may pass the forward link data to control circuitry 66 for subsequent processing. Control circuitry 66 may transmit the received forward link data and/or information about the received forward link data to satcom network region 20 via terrestrial network communications interface 64 and communication link(s) 82. Satcom network region 20 may process the forward link data or the information about the forward link data to monitor the network performance of satellite constellation 32 and/or gateway(s) 14.

Multiple monitoring devices 40 may be distributed across different locations or regions on Earth (e.g., regions that are provided with satellite communications capacity and coverage by the satellites 12 in satellite constellation 32). These regions may be regions where UE devices are expected to be present. This may allow monitoring devices 40 to transmit reverse link data and/or to receive forward link data similar to as would be handled by UE devices 10 in communicating with gateway(s) 14 via satellite constellation 32. Whereas UE devices 10 transmit full-stack wireless data to and receive wireless data from end hosts of terrestrial network 34 via satellite constellation 32 and gateway(s) 14 (e.g., email data, internet browser data, streaming video data, streaming music data, messaging data, gaming data, cloud computing data, distributed processing data, etc.), monitoring devices 40 may, for example, transmit simplified data to and/or may receive data from gateway(s) 14 via satellite constellation 32 solely for the purpose of allowing satcom network region 20 to monitor the network performance of gateway(s) 14 and/or satellite constellation 32. The network performance monitoring functions may be transparent to satellite constellation 32, gateway(s) 14, NOC 16, and any other network nodes not associated with or a part of satcom network region 20 (e.g., the data conveyed by monitoring devices 40 via satellite constellation 32 may be indistinguishable to satellite constellation 32, gateway(s) 14, NOC 16, and any other network nodes not associated with or a part of satcom network region 20 from data conveyed by UE devices 10).

Figure 5:
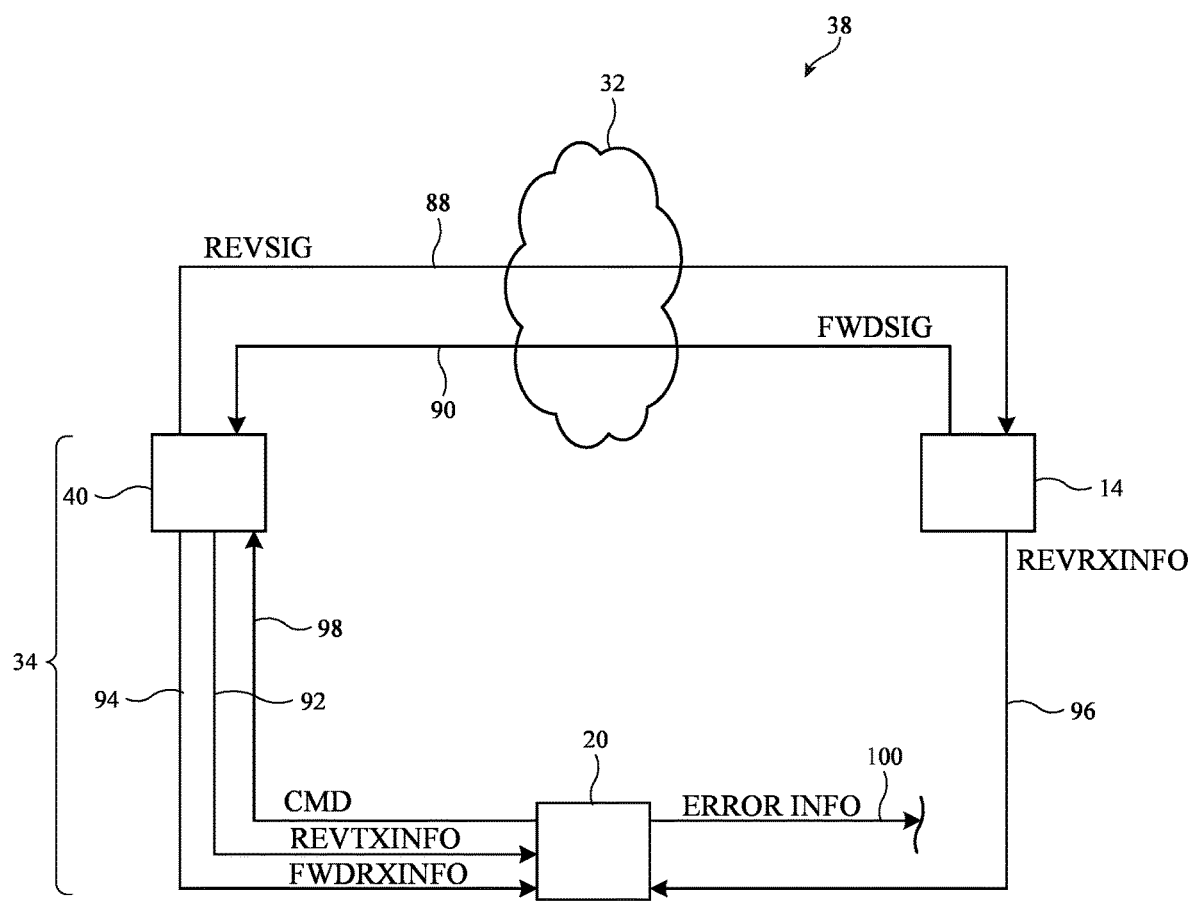
FIG. 5 is a diagram showing how illustrative signals may be conveyed between a network performance monitoring device, a gateway, and a satellite communications (satcom) network region for monitoring network performance in accordance with some embodiments.

FIG. 5 is a diagram showing how information may be conveyed between monitoring device 40, a given gateway 14, and satcom network region 20 for use by satcom network region in monitoring the network performance of satellite constellation 32 and/or gateway(s) 14. The signals conveyed by UE devices 10 (FIG. 1) have been omitted from FIG. 5 for the sake of clarity.

As shown in FIG. 5, monitoring device 40 may transmit reverse link signals REVSIG to gateway 14 via one or more satellites 12 in satellite constellation 32, as shown by arrow 88. Reverse link signals REVSIG may include reverse link data (e.g., fully qualified packets/datagrams) generated by SDR 76 (FIG. 4). Conversely, gateway 14 may transmit forward link signals FWDSIG to satellite constellation 32, as shown by arrow 90. Satellite constellation 32 may transmit or broadcast forward link signals FWDSIG within a corresponding signal beam that overlaps a geographic region on Earth (e.g., a spot beam on Earth). Any UE devices 10 that are within this region may receive forward link signals FWDSIG. Monitoring device 40 may also receive forward link signals FWDSIG when monitoring device 40 is within this region. Forward link signals FWDSIG may include broadcast data, reference signals, synchronization signals (e.g., timer signals transmitted at a broadcast interval), and/or forward link data to be received by one or more UE devices 10.

Gateway 14 may receive reverse link signals from satellite constellation 32. The received reverse link signals may include the reverse link signals REVSIG generated by monitoring device 40. The received reverse link signals may also include reverse link signals generated by UE devices 10. Gateway 14 may forward (received) reverse link signal information REVRXINFO to satcom network region 20 as shown by path 96 (e.g., via one or more communications links in terrestrial network 34). Reverse link signal information REVRXINFO may include reverse link data from the reverse link signals received by gateway 14. The reverse link data may include the reverse link data generated by monitoring device 40 and included in reverse link signals REVSIG and/or reverse link data generated by UE devices 10 and included in the other reverse link signals received at gateway 14. Reverse link signal information REVRXINFO may also include information about the received reverse link signals.

Satcom network region 20 may process the reverse link signals received by gateway 14 and identified by (included in) reverse link signal information REVRXINFO (e.g., in accordance with communications services provided to UE devices 10 by the communications network service provider associated with satcom network region 20). For example, satcom network region 20 may forward reverse link data generated by UE device(s) 10 to its intended destination(s) (e.g., server(s), UE device(s) 10, or other end host(s) of terrestrial network 34).

As shown in FIG. 5, satcom network region 20 may transmit control signals (commands) CMD and may transmit controls signals CMD to monitoring device 40, as shown by arrow 98. Control signals CMD may control one or more operations of monitoring device 40. As an example, control signals CMD may control monitoring device 40 to transmit particular reverse link data in reverse link signals REVSIG, may instruct monitoring device 40 when to transmit reverse link signals REVSIG, may instruct monitoring device 40 when not to transmit reverse link signals REVSIG, may transmit payload information for the reverse link data to be transmitted by monitoring device 40, etc. Monitoring device 40 may generate (transmitted) reverse link signal information REVTXINFO that is associated with the reverse link signals REVSIG transmitted to gateway 14. Reverse link signal information REVTXINFO may include the reverse link data included in reverse link signal REVSIG itself and/or information about the transmitted reverse link data and/or reverse link signals.

Monitoring device 40 may receive the forward link signals FWDSIG transmitted by gateway 14 via satellite constellation 32. Monitoring device 40 may generate (received) forward link signal information FWDRXINFO in response to the received forward link signals FWDSIG. Forward link signal information FWDRXINFO may include the forward link data included in forward link signals FWDSIG and/or information about the received forward link signals FWDSIG and/or the forward link data. Monitoring device 40 may transmit forward link signal information FWDRXINFO to satcom network region 20, as shown by arrow 94, and may transmit reverse link signal information REVTXINFO to satcom network region 20, as shown by arrow 92 (e.g., via communications link(s) 82 of FIG. 4 and terrestrial network 34 without routing the information via satellite constellation 32).

Satcom network region 20 may use the unique identifier associated with monitoring device 40 to identify reverse link data generated by monitoring device 40 in the reverse link signals received by gateway 14 (e.g., to distinguish the reverse link data generated by monitoring device 40 for monitoring network performance from reverse link data generated by UE devices 10). Satcom network region 20 may process the reverse link data generated by monitoring device 40 and/or the information about the reverse link signals REVSIG received at gateway 14 as included in reverse link signal information REVRXINFO, the forward link signal information FWDRXINFO received from monitoring device 40, and/or the reverse link signal information REVTXINFO received from monitoring device 40 to monitor (e.g., identify, assess, analyze, track, detect, sense, determine, etc.) the network performance of satellite constellation 32 and gateway(s) 14 in providing communications capacity to UE devices 10.

As part of monitoring the network performance, satcom network region 20 may identify one or more errors, non-idealities, or other network performance issues associated in satellite constellation 32 and/or gateway(s) 14 that impact, limit, deteriorate, or otherwise affect the wireless communications provided to UE device(s) 10 (e.g., that introduce or produce unexpected, unpredicted, or otherwise non-nominal values or results in the signals or data conveyed along the corresponding communications path). Satcom network region 20 may also identify one or more sources or locations of the errors, non-idealities, or other network performance issues. If desired, satcom network region 20 may generate network error information ERRORINFO based on reverse link signal information REVRXINFO, forward link signal information FWDRXINFO, and/or the reverse link signal information REVTXINFO. Satcom cloud region 20 may transmit network error information ERRORINFO to gateway(s) 14, an operator, administrator, or technician of gateway(s) 14, satellite constellation 32, an operator, administrator, or technician of satellite constellation 32 (e.g., NOC 16 or an operator of NOC 16 of FIG. 1), and/or any other desired entities or parties. Network error information ERRORINFO may include information identifying location(s) or likely location(s) of one or more errors, non-idealities, or problems in the communications path(s) between gateway(s) 14 and UE device(s) 10 via satellite constellation 32. Network error information ERRORINFO may also include one or more adjustment commands that instruct gateway(s) 14, NOC 16, and/or satellite constellation 32 to alter how communications are performed (e.g., in a manner that alleviates or mitigates the identified errors, non-idealities, or other network performance issues).

Figure 6:
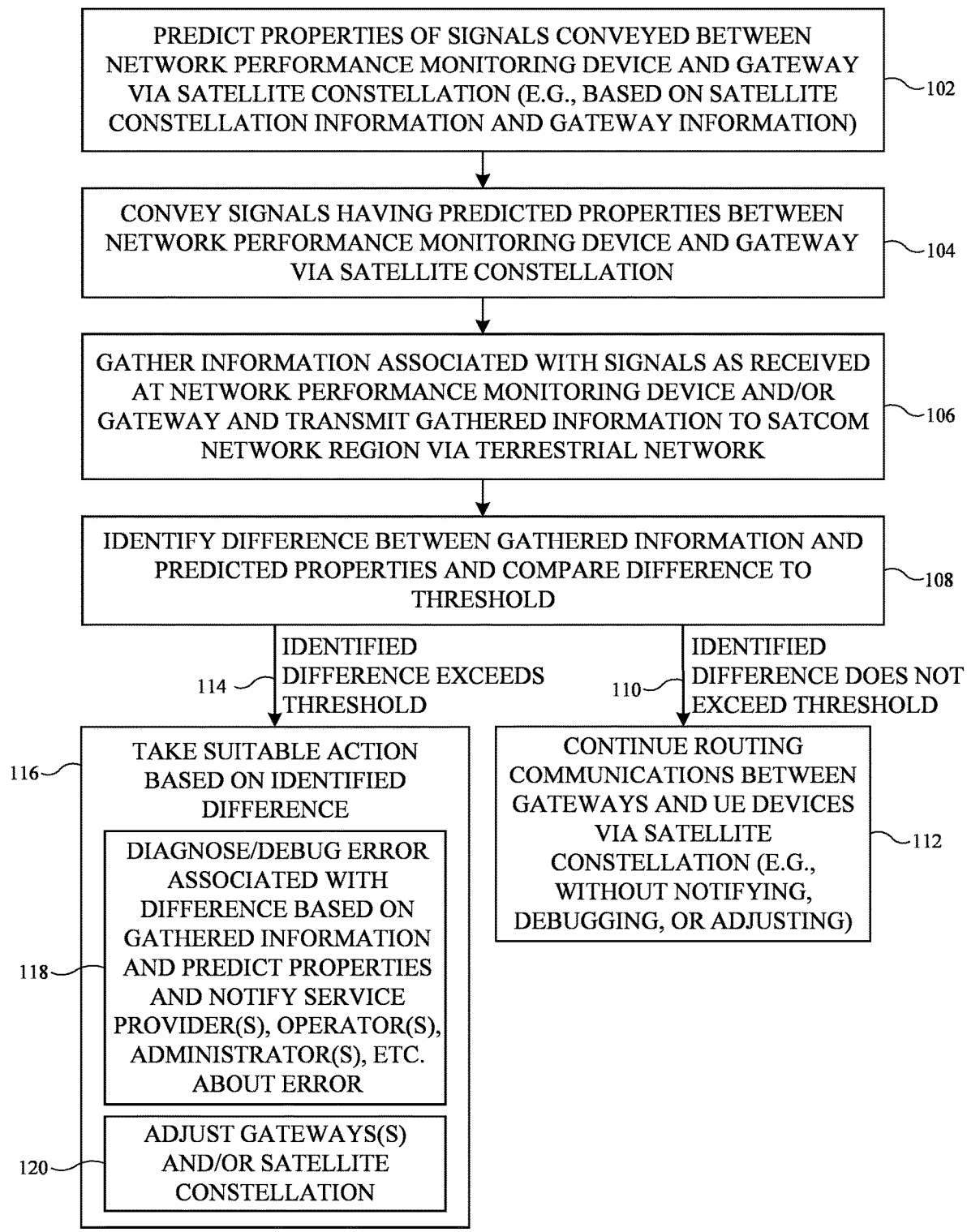
FIG. 6 is a flow chart of illustrative operations that may be performed by a communications system to monitor network performance using a network performance monitoring device in accordance with some embodiments.

FIG. 6 is a flow chart of illustrative operations that may be performed by communications system 38 to monitor the network performance of satellite constellation 32 and/or gateway(s) 14 in real-time using at least one monitoring device 40. While a single monitoring device 40 is described herein as an example, similar operations may be performed across many monitoring devices 40 distributed across Earth (e.g., to fully assess the performance of all the gateways 14 and satellites 12 associated with NOC 16).

At operation 102, satcom network region 20 may predict properties (e.g., expected properties) of forward link signals FWDSIG and/or reverse link signals REVSIG that are to be transmitted between monitoring device 40 and gateway 14 via satellite constellation 32 at one or more predetermined times. The predetermined times may be given by a communications schedule generated by or known to satcom network region 20. The predicted properties may include predicted wireless performance metric data such as predicted received power levels, signal-to-noise ratio values, sensitivity values, timing information, etc. Satcom cloud region 20 may predict the expected properties based on the known future location of monitoring device 40, gateway 14, and/or the satellites 12 in satellite constellation 32 at the one or more predetermined times. Satcom cloud region 20 may know the future location of satellites 12 based on satellite location information received from NOC 16. The satellite information may include a satellite almanac identifying the position (e.g., orbit information, elevation information, altitude information, inclination information, eccentricity information, orbital period information, trajectory information, right ascension information, declination information, ground track information, etc.) and/or the velocity of each of the satellites 12 in satellite constellation 32 (e.g., relative to the surface of Earth). Operation 102 may, if desired, be performed concurrently with one or more of the other operations shown in FIG. 6.

At operation 104, monitoring device 40 and gateway 14 may convey forward link signals FWDSIG and/or reverse link signal REVSIG via satellite constellation 32. Monitoring device 40 may receive forward link signals FWDSIG and/or gateway 14 may receive reverse link signals REVSIG (e.g., at the one or more predetermined times). These signals may be signals having the properties as predicted by satcom network region 20 while processing operation 102.

Monitoring device 40 may transmit reverse link signal information REVTXINFO to satcom network region 20 via terrestrial network 34. Reverse link signal information REVTXINFO may include information associated with the transmitted reverse link signals REVSIG. Reverse link signal information REVTXINFO may include, for example, the reverse link data (e.g., payload data) transmitted in reverse link signals REVSIG, information identifying one or more properties of the transmitted reverse link signals REVSIG (e.g., timing information identifying when the reverse link signals REVSIG were transmitted, frequency information, duty cycle information, position information, header information, etc.).

At operation 106, monitoring device 40 may gather information associated with received forward link signals FWDSIG. The gathered information may include wireless performance metric data associated with the reception of forward link signals FWDSIG. The wireless performance metric data may include received power level values, sensitivity values, frequency information, noise values (e.g., noise floor values), signal-to-noise ratio (SNR) values, error rate values, signal quality values, other wireless performance metric values characterizing the received forward link signals. The gathered information may also include radio-frequency timing information such as timestamp(s) at which the forward link signals were received and/or transmitted, identification information from the forward link data in the forward link signals, information associated with the satellite(s) 12 in satellite constellation 32 that transmitted the received forward link signals, information associated with the gateway 14 that transmitted the received forward link signals, and/or any other desired information. Monitoring device 40 may generate forward link signal information FWDRXINFO. Forward link signal information FWDRXINFO may include the gathered information (e.g., the gathered wireless performance metric data) and/or forward link data from the received forward link signals. Monitoring device 40 may transmit forward link signal information FWDRXINFO to satcom network region 20 via terrestrial network 34.

Similarly, gateway 14 may gather information associated with received reverse link signals REVSIG. The gathered information may include wireless performance metric data associated with the reception of reverse link signals REVSIG. The wireless performance metric data may include received power level values, sensitivity values, noise values (e.g., noise floor values), signal-to-noise ratio (SNR) values, frequency information, error rate values, signal quality values, other wireless performance metric values characterizing the received reverse link signals. The gathered information may also include radio-frequency timing information such as timestamp(s) at which the reverse link signals were received and/or transmitted, information associated with the satellite(s) 12 in satellite constellation 32 that transmitted the received reverse link signals, and/or any other desired information. Gateway 14 may generate reverse link signal information REVRXINFO. Reverse link signal information REVRXINFO may include the gathered information (e.g., the gathered wireless performance metric data) and/or reverse link data from the received reverse link signals. Gateway 14 may transmit reverse link signal information REVRXINFO to satcom network region 20 via terrestrial network 34.

At operation 108, satcom network region 20 may identify (e.g., detect, compute, calculate, determine, generate, sense, measure, etc.) one or more differences between the predicted properties of the signals conveyed between monitoring device 40 and gateway 14 via satellite constellation 32 and the signals as actually received at gateway 14 or monitoring device based on the reverse link signal information REVRX-INFO transmitted by (received from) monitoring device 40, the forward link signal information FWDRXINFO transmitted by (received from) monitoring device 40, and/or the reverse link signal information REVRXINFO transmitted by (received from) gateway 14. The differences may include differences between the predicted wireless performance metric data and the wireless performance metric data generated by gateway 14 and/or monitoring device 40, differences between the predicted and actual times at which the signals are received by gateway 14 and/or monitoring device 40, and/or any other desired differences between one or more predicted properties of the conveyed signals and the actual (measured) properties of conveyed signals.

The one or more differences need not be only between predicted properties and measured signals and, more generally, may be one or more differences or deviations from any expected, desired, or nominal performance of one or more nodes components of nodes along the communications path. This may include, for example, accounting of an intent to transmit from a system that is fed time slices (e.g., times when to send) by a scheduler on satcom network region where the system then feeds the MAC PHY at gateway 14 to act and PHY log events for acknowledgement at satcom network region 20. Other examples of differences that may be identified by satcom network region 20 may include, for example, differences between actual and predicted gateways 14, actual and predicted antennas, actual and predicted signal beams, failure of a datagram, excessive SNR, excessive noise, excessive power differences, excessive latency between monitoring device 40 and gateway 14, excessive decoding or processing time, other timing errors, insufficient data rate, etc.

Satcom network region 20 may store the one or more identified differences and may compare the one or more identified differences to one or more predetermined thresholds (or to ranges of differences as defined or bound by one or more predetermined thresholds). If desired, satcom network region 20 may compare differences over a given time period, differences accumulated from many monitoring devices 40 and/or gateways 14, and/or statistics associated with the differences as tracked over time to the one or more predetermined threshold values.

If the identified difference(s) do not exceed the predetermined threshold(s) (or fall within a range of acceptable difference values), processing may proceed to operation 112 via path 110. This may be indicative of satellite constellation 32 and/or gateway(s) 14 operating nominally and with satisfactory levels of wireless performance in conveying wireless data with UE device(s) 10. At operation 112, satellite constellation 12 and gateway(s) 14 may continue to convey wireless data with UE device(s) 10 (e.g., without satcom network region 20 transmitting error information ERRORINFO).

If the identified difference(s) exceed the predetermined threshold(s) (or fall outside the range of acceptable difference values), processing may proceed from operation 108 to operation 116 via path 114. This may be indicative of satellite constellation 32 and/or gateway(s) 14 operating with unsatisfactory, non-ideal, deteriorated, or limited levels of wireless performance in conveying wireless data with UE device(s) 10.

At operation 116, satcom network region 20 may take suitable action based on the identified difference(s) (e.g., by generating and transmitting error information ERRORINFO). For example, at operation 118, satcom network region 20 may detect, identify, diagnose, and/or debug one or more errors, problems, or other non-idealities in satellite constellation 32 and/or gateway(s) 14 that limit, deteriorate, or otherwise impact the performance of communications system 38 in conveying wireless data between gateway(s) 14 and UE device(s) 10 via satellite constellation 32. Error information ERRORINFO may include information identifying the errors, problems, or other non-idealities. If desired, at operation 118, satcom network region 20 may identify one or more points in communications system 38 that produced or are likely to have produced the identified errors, problems, or other non-idealities based on the identified difference(s). How the received signals differ from the predicted signals may be indicative of where faults or errors occurred between gateway 14 and monitoring device 40, for example. Error information ERRORINFO may include information identifying these one or more points in communications system 38 that produced or are likely to have produced the identified errors, problems, or other non-idealities.

In other words, satcom network region 20 may analyze, examine, or otherwise process the signals and/or data transmitted by monitoring device 40 and/or gateway 14 at each major component in the corresponding communications path to identify a point of failure (error) or likely failure. Error information ERRORINFO may, if desired, include information identifying this point or that can be used to identify this point. As an example, satcom network region 20 may predict that the system should transmit a signal at a power level P and may discover, through processing the operations of FIG. 6, that the scheduler failed to transmit, that an FPGA on monitoring device 40 or gateway 14 failed to encode the signal, that an antenna on gateway 14 failed to track, that servers or compute circuitry on gateway 14 never received a signal or were overloaded, etc. Through the comparison and processing as described herein, satcom network region 20 may detect not only the presence of an error or missed signal, but may detect where the signal was dropped along the communications path between the transmitting device and satcom network region 20 (e.g., anywhere from monitoring device 40 to satellite constellation 32, to the antenna at gateway 14, to a server or processor in gateway 14, through the terrestrial network, and to communications circuitry or storage at or within satcom network region 20 itself, etc.).

If desired, at operation 120, satcom cloud network 20 may generate commands or control signals that direct satellite constellation 32, gateway 14, and/or the operator(s) of satellite constellation 32 and/or gateway 14 to adjust one or more components on satellite constellation 32 and/or gateway 14 based on (e.g., in a manner that mitigates) the identified difference(s). Error information ERRORINFO may include these commands or control signals. Satcom network region 20 may transmit error information ERRORINFO to gateway 14, NOC 16, satellite constellation 32, and/or an operator, technician, service provider, administrator, and/or any other entity associated with gateway 14, NOC 16, and/or satellite constellation 32. The operator, technician, service provider, administrator, and/or any other entity associated with gateway 14, NOC 16, and/or satellite constellation 32 may, for example, use the information about the identified difference(s) in error information ERRORINFO (e.g., as generated at operation 118) to diagnose, debug, correct, and/or repair any errors in satellite constellation 32 and/or gateway 14 that produced the identified difference(s) (e.g., to maximize the wireless performance and capacity provided to UE device(s) 10, to ensure that the operator, technician, service provider, administrator, and/or any other entity is in compliance with an SLA with the service provider associated with satcom network region 20, etc.). The commands or control signals may additionally or alternatively adjust other portions of the communications network such as a system data rate and/or a load of compute within gateway 14.

Figure 7:
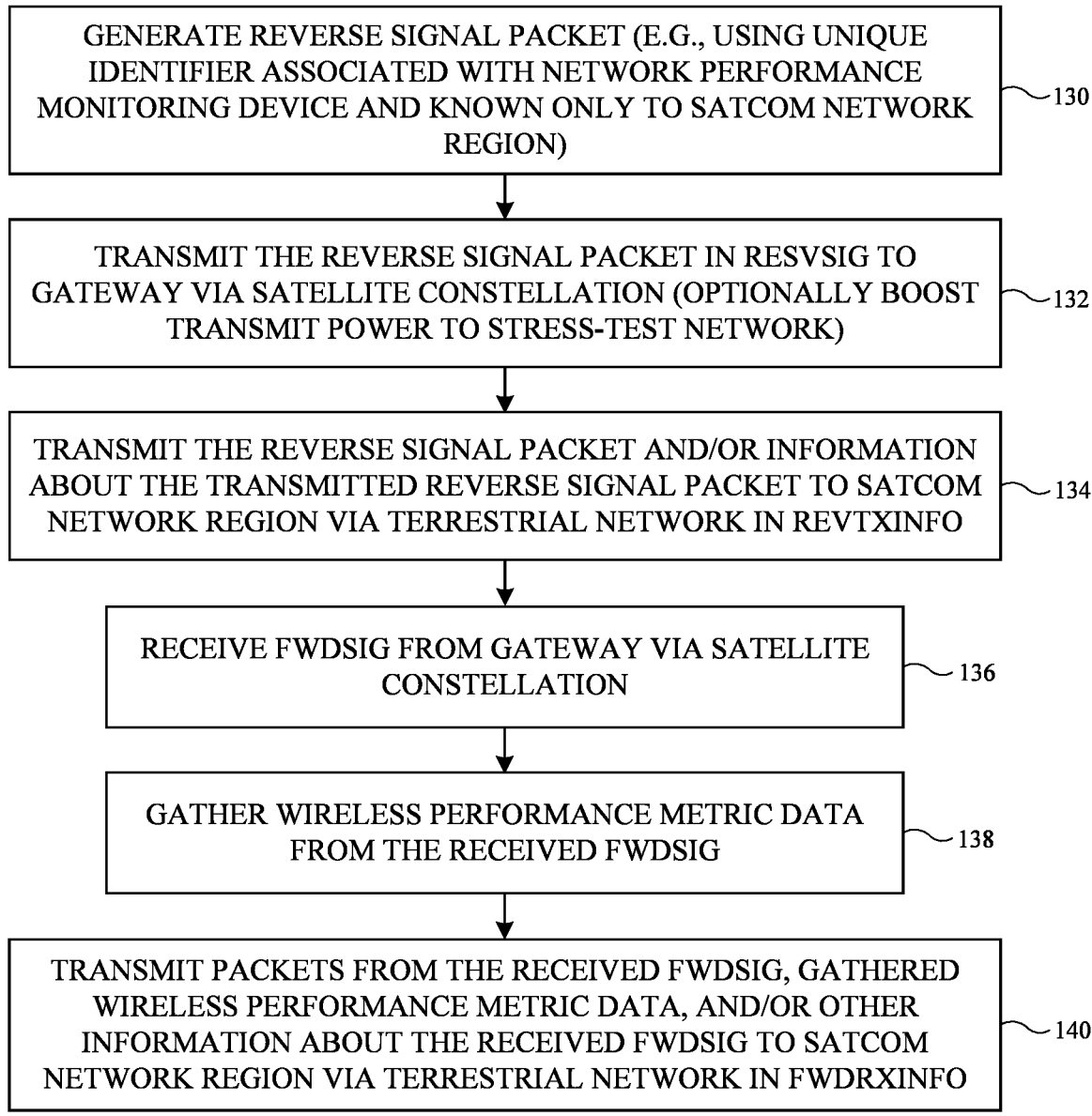
FIG. 7 is a flow chart of illustrative operations that may be performed by a network performance monitoring device to monitor network performance of a communications system in accordance with some embodiments.

FIG. 7 is a flow chart of illustrative operations that may be performed by monitoring device 40 to monitor the network performance of satellite constellation 32 and gateway 14 in conveying wireless data with UE device(s) 10. The operations of FIG. 7 may, for example, be performed while processing operations 104-106 of FIG. 6.

At operation 130, monitoring device 40 (e.g., control circuitry 66 and/or SDR 76 of FIG. 4) may generate reverse link data. The reverse link data may include one or more reverse link signal packets. Each reverse link signal packet may include payload data and one or more headers. Monitoring device 40 may generate the reverse link signal packet using a unique identifier associated with monitoring device 40 (e.g., that uniquely identifies monitoring device as a monitoring device 40 instead of a UE device 10 and/or that uniquely identifies which monitoring device 40 generated the packet). Monitoring device 40 may include the unique identifier in a header or payload field of the reverse link signal packet or may, if desired, encode or encrypt some or all of the reverse link signal packet using (based on) the unique identifier. Satcom network region 20 may have knowledge of the unique identifier (or a corresponding key associated with the unique identifier). Other portions of communications system 38 may have no knowledge of the unique identifier.

At operation 132, space network communications interface 86 on monitoring device 40 may transmit the generated reverse link data in reverse link signals REVSIG. Antenna(s) 80 may transmit reverse link signals REVSIG to one or more satellites 12 in satellite constellation 32. Satellite constellation 32 may relay reverse link signals REVSIG to one or more gateways 14 on Earth. If desired, space network communications interface 86 may boost the transmit power of reverse link signals REVSIG (e.g., to a maximum transmit power level of monitoring device 40) to stress test satellite constellation 32 and/or gateway(s) 14. Boosting the power in this way may produce more signal noise at gateway(s) 14, making it more difficult for gateway(s) 14 to detect and decode reverse link signals (e.g., reverse link data) in the electromagnetic energy received by the antennas on gateway(s) 14. This may help monitoring device 40 and satcom network region 20 to periodically test the network performance of gateway(s) 14 for a potential future scenario in which the network is stressed by an unusually high load or an unusually high number of UE devices 10 (e.g., to simulate a disaster scenario in which terrestrial-based wireless communications equipment 22 is unavailable before such a scenario actually arises).

At operation 134, monitoring device 40 may transmit reverse link signal information REVTXINFO to satcom cloud region 20 (e.g., using terrestrial network communications interface 64 and communications link(s) 82 of FIG. 4). Reverse link signal information REVTXINFO may include information about the transmitted reverse link signals REVSIG such as a copy of the reverse link data that was transmitted in reverse link signals REVSIG and/or information identifying one or more properties of the transmitted reverse link signals REVSIG (e.g., timing information identifying when the reverse link signals REVSIG were transmitted, frequency information, duty cycle information, position information, transmit power level information, header information, etc.). Operation 134 may be performed concurrently with operation 132 if desired.

Operations 130-134 are associated with the transmission of reverse link data at monitoring device 40. Operations 136-140 are associated with the reception of forward link data at monitoring device 40. Operations 130-134 may be omitted or operations 136-140 may be omitted if desired. Operations 136-140 may be performed prior to operations 130-134 or may be performed concurrently with one or more of operations 130-134 (e.g., may be interleaved using a time division duplexing scheme).

At operation 136, space network communications interface 86 on monitoring device 40 may receive forward link signals FWDSIG from satellite constellation 32. SDR 76 may decode/demodulate the forward link signals to recover forward link data from the forward link signals. SDR 76 may pass the forward link data to control circuitry 66. If desired, control circuitry 66 and/or SDR 76 may adjust the received forward link signals or forward link data to help ensure that monitoring device 40 receives the forward link signals at a steady state over time. This may include, for example, adding or subtracting power to the received signal to ensure that the power level remains steady or constant over time. This may help monitoring device 40 to mitigate the effects of a variable ambient temperature (e.g., temperature changes in the geographic region where monitoring device 40 is located) on how monitoring device 40 receives forward link signals. If desired, the transmitted reverse link signals REV may be periodically measured by radio-frequency circuitry such as a radio-frequency power meter (e.g., at monitoring device 40) and compared with thermal information against a transmit power (gain) threshold table, where subsequent processing is performed against the thermal table (e.g., in a test mode of a telemetry system). This may allow transmission to be normalized against thermal variance of a UE device 10 itself. Both compensated and non-compensated values may be saved to a central database. The forward link signals FWD may undergo similar but more checks to normalized ingested signal (e.g., against thermal drift). Satcom network region 20 may, for example, be able to distinguish or designate when the telemetry system is in test mode or non-test mode (e.g., to mask undesired data). If desired, multiple telemetry systems may be deployed in clusters to determine if behavior is "in family" as another part of validation.

At operation 138, radio-frequency circuitry 74 and/or SDR 76 may gather (e.g., generate, measure, sense, detect, produce, calculate, compute, etc.) information about the received forward link signals FWDSIG. The gathered information may include wireless performance metric data associated with the reception of forward link signals FWDSIG. The wireless performance metric data may include received power level values, sensitivity values, frequency information, noise values (e.g., noise floor values), signal-to-noise ratio (SNR) values, error rate values, signal quality values, other wireless performance metric values characterizing the received forward link signals. The gathered information may also include radio-frequency timing information such as timestamp(s) at which the forward link signals were received and/or transmitted, identification information from the forward link data in the forward link signals, information associated with the satellite(s) 12 in satellite constellation 32 that transmitted the received forward link signals, information associated with the gateway 14 that transmitted the received forward link signals, and/or any other desired information. Operation 138 may be performed concurrently with operation 136 if desired.

At operation 140, monitoring device 40 may transmit forward link signal information FWDRXINFO to satcom cloud region 20 (e.g., using terrestrial network communications interface 64 and communications link(s) 82 of FIG. 4). Forward link signal information FWDRXINFO may include a copy of the forward link data that was received in forward link signals FWDSIG (e.g., one or more forward link signal packets) and/or the gathered information about the received forward link signals FWDSIG (e.g., as gathered while processing operation 138). Operation 134 may be performed concurrently with operation 132 if desired.

Figure 8:
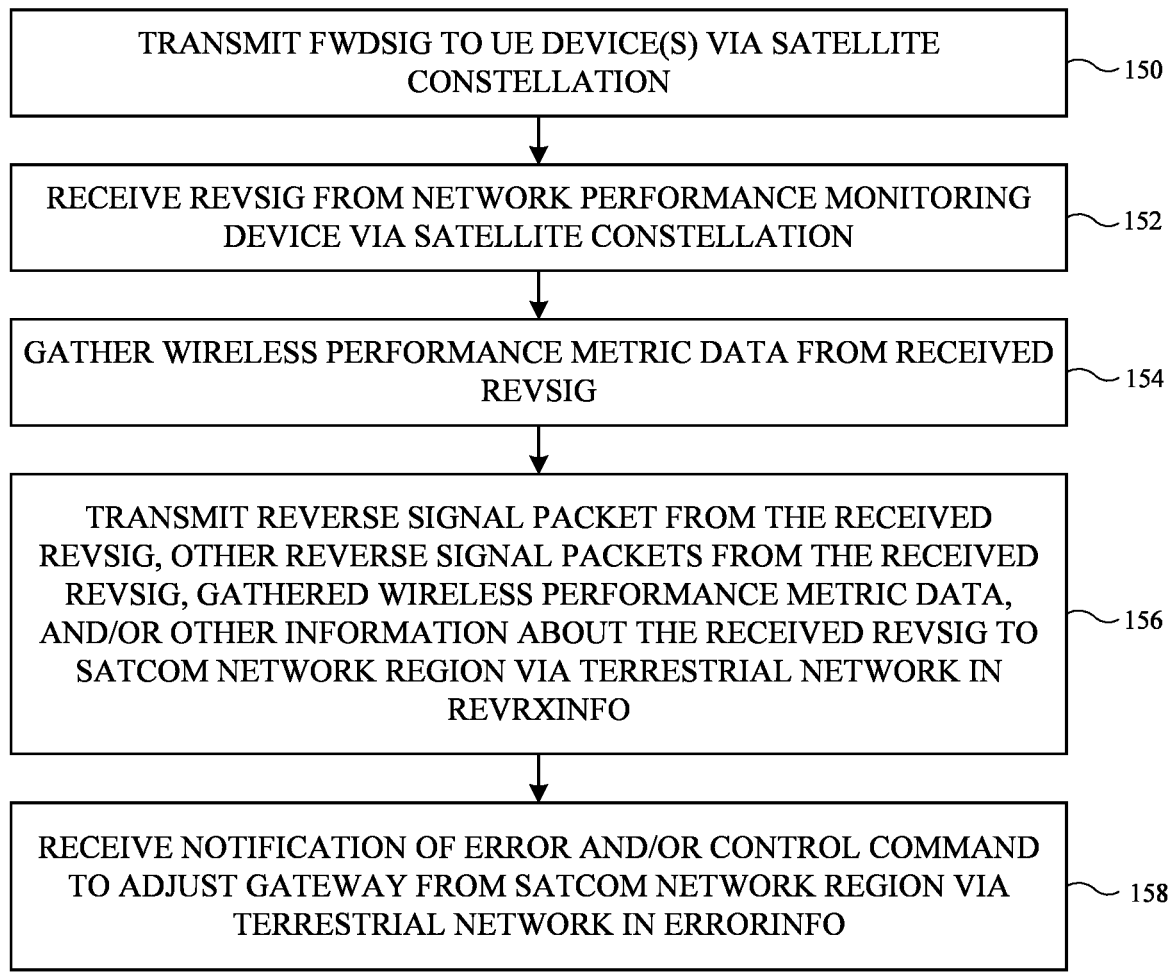
FIG. 8 is a flow chart of illustrative operations that may be performed by a gateway while a network performance monitoring device monitors network performance in accordance with some embodiments.

FIG. 8 is a flow chart of illustrative operations that may be performed by gateway 14 while monitoring device 40 and satcom network region 20 are monitoring the network performance of satellite constellation 32 and gateway 14 in conveying wireless data with UE device(s) 10. Operations 150-156 of FIG. 8 may, for example, be performed while processing operations 104-106 of FIG. 6.

At operation 150, gateway 14 may transmit forward link signals FWDSIG to UE device(s) 10 via satellite constellation 32 (e.g., based on a forward link grant scheduled for gateway 14 by satcom network region 20). Forward link signals FWDSIG may include forward link data (e.g., destined for one or more UE devices 10), broadcast signals, timing signals, synchronization signals, etc. Forward link signals FWDSIG may be received by monitoring device 40 when monitoring device 40 is in a region that receives forward link signals FWDSIG from one of the satellites 12 in satellite constellation 32.

At operation 152, gateway 14 may receive, via satellite constellation 32, the reverse link signals REVSIG transmitted by monitoring device 40. Gateway 14 may extract, demodulate, or decode the reverse link data (e.g., reverse link signal packets) in the received reverse link signals REVSIG. The reverse link data may appear to gateway 14 as indistinguishable from reverse link data transmitted by UE devices 10.

At operation 154, gateway 14 may gather information associated with received reverse link signals REVSIG. The gathered information may include wireless performance metric data associated with the reception of reverse link signals REVSIG. The wireless performance metric data may include received power level values, sensitivity values, noise values (e.g., noise floor values), signal-to-noise ratio (SNR) values, frequency information, error rate values, signal quality values, other wireless performance metric values characterizing the received reverse link signals. The gathered information may also include radio-frequency timing information such as timestamp(s) at which the reverse link signals were received and/or transmitted, information associated with the satellite(s) 12 in satellite constellation 32 that transmitted the received reverse link signals, and/or any other desired information. Operation 154 may be performed concurrently with operation 152 if desired.

At operation 156, gateway 14 may transmit reverse link signal information REVRXINFO to satcom cloud region 20 (e.g., via a terrestrial network link). Reverse link signal information REVRXINFO may include a copy of the reverse link data that was received in reverse link signals REVSIG (e.g., one or more reverse link signal packets) and/or the gathered information about the received reverse link signals REVSIG (e.g., as gathered while processing operation 154). Gateway 14 may also receive other reverse link signals from satellite constellation 32 that were transmitted by UE device(s) 10. Gateway 14 may extract reverse link data from these reverse link signals and may include the reverse link data an information about the reverse link data in reverse link signal information REVRXINFO. Satcom network region 20 may forward the reverse link data generated by UE device(s) 10 and included in reverse link signal information REVRXINFO to corresponding destination end host(s) in the terrestrial network.

At operation 158, gateway 14 may receive error information ERRORINFO from satcom network region 20 (e.g., via the terrestrial network). Operation 158 may, for example, be performed while processing operation 116 of FIG. 6. Error information ERRORINFO may include information identifying the errors, problems, or other non-idealities in the conveyance of wireless data with UE device(s) 10 using satellite constellation 32 and/or gateway 14 (e.g., as identified by satcom cloud region 20 based on reverse link signal information REVTXINFO, reverse link signal information REVRXINFO, and/or forward link signal information FWDRXINFO). Error information ERRORINFO may, for example, identify one or more points in gateway 14 and/or satellite constellation 32 that produced the identified errors, problems, or other non-idealities. This information may allow an operator, technician, administrator, or service provider associated with gateway 14 to debug, diagnose, repair, and/or adjust the operation of gateway 14 and/or satellite constellation 32 (e.g., in a way that mitigates the identified errors, problems, or other non-idealities).

Additionally or alternatively, error information ERRORINFO may include commands or control signals that adjust the operation of one or more components of gateway 14 and/or satellite constellation 32. Gateway 14 may adjust the operation of one or more of its components (e.g., power supplies, antennas, amplifiers, transmitters, receivers, active signal beams, etc.) based on the received commands or control instructions. In examples where error information ERRORINFO includes commands or control signals that adjust the operation of satellite constellation 32, gateway 14 may use uplink signals to transmit the commands or control signals to satellite constellation 32. The commands or control signals may adjust the operation of one or more components on one or more satellites 12 in satellite constellation 32 (e.g., power supplies, antennas, amplifiers, transmitters, receivers, active signal beams, etc.). One or more of operations 152-158 may be performed prior to or concurrently with operation 150.

Figure 9:
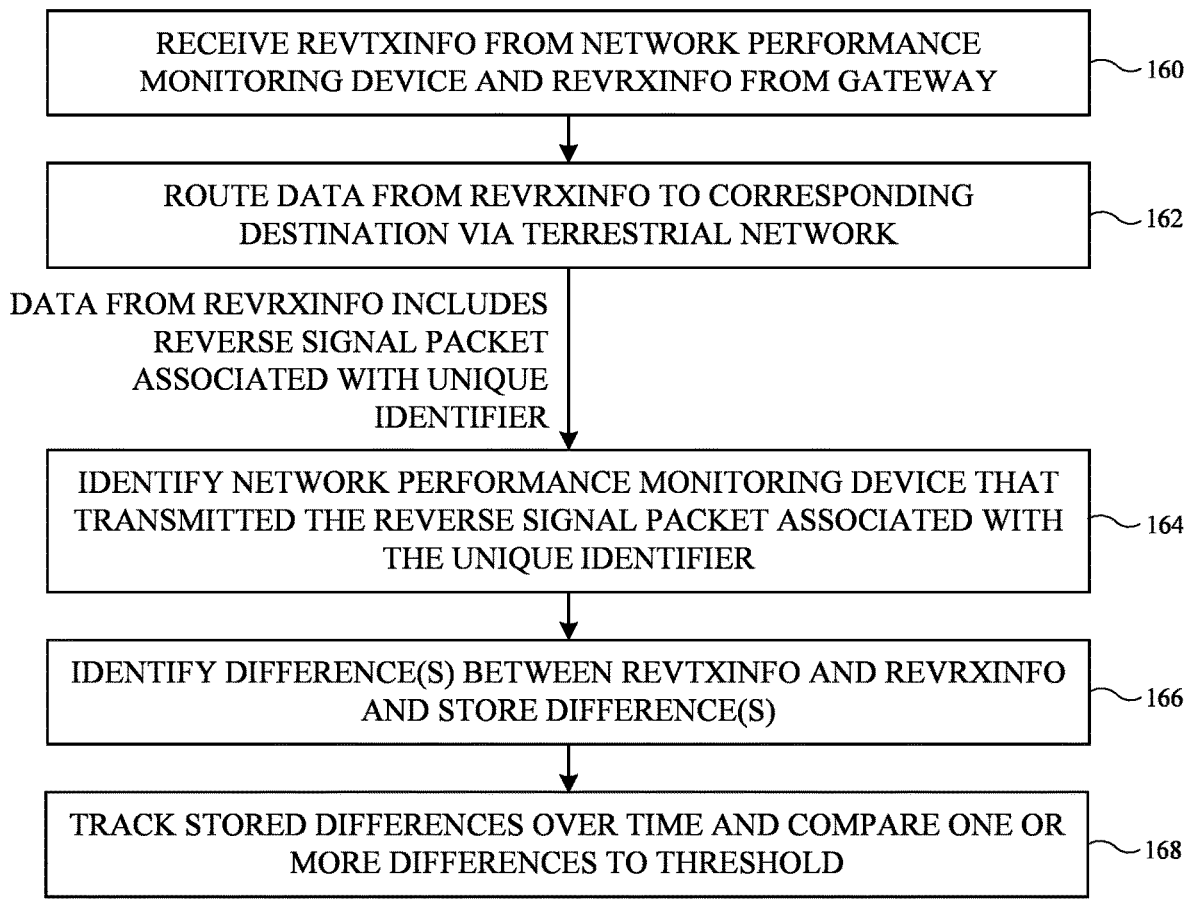
FIG. 9 is a flow chart of illustrative operations that may be performed by a satcom network region to monitor network performance of a communications system using reverse link signals transmitted by a network performance monitoring device in accordance with some embodiments.

Satcom network region 20 may use the reverse link signals transmitted by monitoring device 40 and/or the forward link signals received by monitoring device 40 to monitor the network performance of satellite constellation 32 and gateway 14 in providing communications services to UE device(s) 10. FIG. 9 is a flow chart of illustrative operations that may be performed by satcom cloud region 20 to monitor the network performance of satellite constellation 32 and gateway 14 based on (using) reverse link signals transmitted by monitoring device 40.

At operation 160, satcom network region 20 may receive reverse link signal information REVTXINFO from monitoring device 40. Satcom network region 20 may also receive reverse link signal information REVRXINFO from gateway 14. Operation 160 may be performed while processing operation 106 of FIG. 6, for example.

At operation 162, satcom network region 20 may route (forward) reverse link data in the reverse link signal information REVRXINFO that was transmitted by UE device(s) 10 to corresponding destination end host(s) in the terrestrial network. In this way, satcom network region 20 may provide communication services to UE device(s) 10. Conversely, satcom network region 20 may receive wireless data from source end host(s) in the terrestrial network bound for destination UE device(s) 10. Satcom network region 20 may convey this wireless data to UE device(s) 10 via terrestrial network 34 when terrestrial network wireless communication links 36 (FIG. 1) are available to the UE device(s) 10. When the UE device(s) 10 are unreachable via the terrestrial network (e.g., when terrestrial network wireless communication links 36 are unavailable), satcom network region 20 may transmit the wireless data to gateway(s) 14, which transmit the wireless data as forward link data in forward link signals FWDSIG transmitted to the UE device(s) 10 via satellite constellation 32.

When the reverse link signal information REVRXINFO received from gateway 14 includes reverse link data generated by monitoring device 40, processing may proceed to operation 164. This reverse link data may include, be encrypted/encoded with, and/or may otherwise be associated with the unique identifier associated with the monitoring device 40 that transmitted the reverse link data. At operation 164, satcom network region 20 may identify the particular monitoring device 40 that transmitted the reverse link data (e.g., the monitoring device 40 that is associated with the unique identifier in the reverse link data).

At operation 166, satcom network region 20 may compare reverse link signal information REVRXINFO to reverse link signal information REVTXINFO to identify (e.g., detect, measure, determine, compute, flag, generate, calculate, etc.) one or more differences between reverse link signal information REVRXINFO and reverse link signal information REVTXINFO (e.g., while processing operation 108 of FIG. 6). Satcom network region 20 may, for example, compare the reverse link data in reverse link signal information REVRXINFO that was transmitted by monitoring device 40 to the corresponding reverse link data in reverse link signal information REVTXINFO to identify the difference(s). Additionally or alternatively, satcom network 20 may compare the information about the transmitted reverse link signals in reverse link signal information REVTXINFO (e.g., wireless performance metric data or other information as generated while processing operation 134 of FIG. 7) to the information about the received reverse link signals in reverse link signal information REVRXINFO (e.g., wireless performance metric data or other information as generated while processing operation 154 of FIG. 7) to identify the difference(s).

If desired, satcom network 20 may store the identified difference(s) in storage (memory). Satcom network 20 may continue to store, accumulate, and/or track the identified differences generated over time and/or may generate statistical information about the identified differences (at operation 168). Satcom network 20 may identify (e.g., calculate, compute, determine, measure, detect, generate, etc.) statistical trends in the differences over time. If desired, satcom network 20 may accumulate the differences associated with reverse link signals generated by multiple (e.g., each) monitoring device 40 in communications system 38 over time (e.g., may identify statistical trends across two or more monitoring devices 40 over time). Satcom network 20 may compare the identified difference(s) produced by reverse link signals REVSIG transmitted by monitoring device 40 over any desired time period (e.g., from one or more transmitted reverse link packets) and/or produced by reverse link signals transmitted by any additional monitoring devices 40 over any desired time period, and/or statistical information associated with these difference(s) to one or more threshold values (e.g., at operation 108 of FIG. 6). When the identified difference(s) and/or the statistical information exceeds one of the threshold values (or falls outside a predetermined range of difference values bound by two or more threshold values), processing may proceed to operation 116 of FIG. 6. Otherwise, processing may proceed to operation 112 of FIG. 6.

Figure 10:
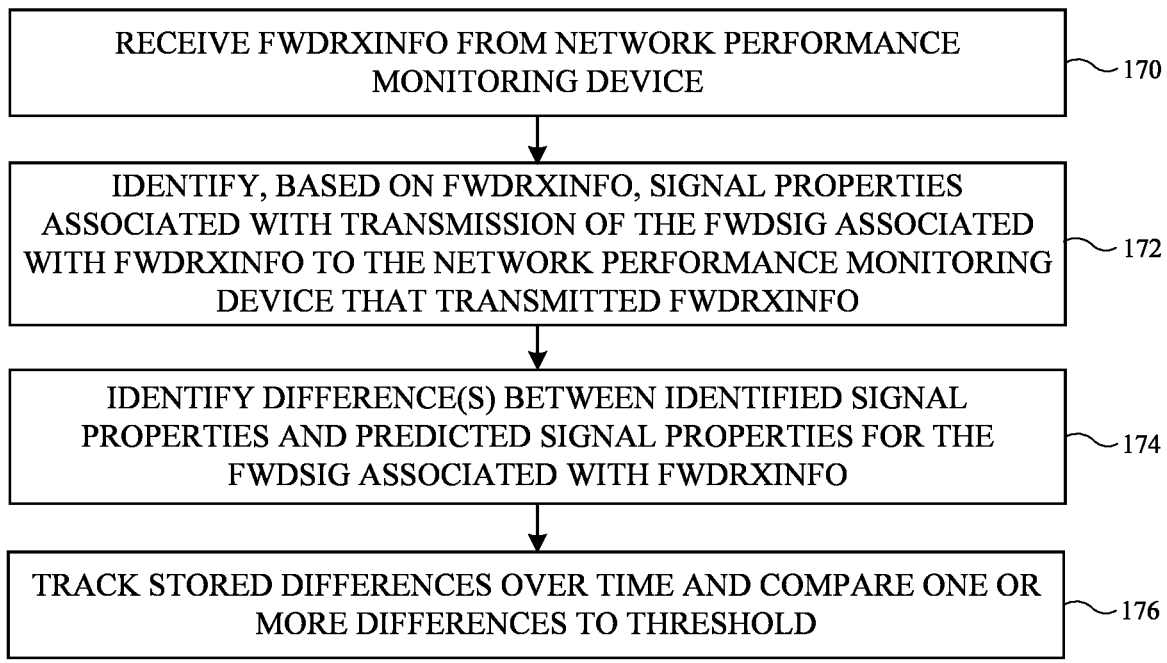
FIG. 10 is a flow chart of illustrative operations that may be performed by a satcom network region to monitor network performance of a communications system using forward link signals received by a network performance monitoring device in accordance with some embodiments.

FIG. 10 is a flow chart of illustrative operations that may be performed by satcom cloud region 20 to monitor the network performance of satellite constellation 32 and gateway 14 based on (using) forward link signals received by monitoring device 40.

At operation 170, satcom network region 20 may receive forward link signal information FWDRXINFO from monitoring device 40. Operation 170 may be performed while processing operation 106 of FIG. 6, for example.

At operation 172, satcom network region 20 may identify the forward link data (e.g., forward link data packets) in forward link signal information FWDRXINFO. Satcom network region 20 may also identify information about the received forward link signals FWDSIG (e.g., signal properties) as generated by monitoring device 40 (e.g., while processing operation 138 of FIG. 7). If desired, satcom network region 20 may also identify information about the signal properties of forward link signals FWDSIG as transmitted by gateway 14.

At operation 174, satcom network region 20 may compare forward link signal information FWDRXINFO to one or more predicted (expected) properties of the corresponding forward link signals FWDSIG received at monitoring device 40 (e.g., as predicted while processing operation 102 of FIG. 6) to identify (e.g., detect, measure, determine, compute, flag, generate, calculate, etc.) one or more differences between forward link signal information FWDRXINFO and the predicted properties.

Satcom network region 20 may, for example, predict (e.g., while processing operation 102 of FIG. 6) wireless performance metric data or other information that should be gathered by monitoring device 40 in receiving forward link signals FWDSIG at one or more predetermined times (e.g., that should be or is expected to be gathered by monitoring device 40 while processing operation 138 of FIG. 7). Satcom network region 20 may then compare the predicted wireless performance metric data or other information to the wireless performance data or other information that was actually gathered by monitoring device 40 (e.g., while processing operation 138 of FIG. 7) to identify the difference(s).

If desired, satcom network 20 may store the identified difference(s) in storage (memory). Satcom network 20 may continue to store, accumulate, and/or track the identified differences generated over time and/or may generate statistical information about the identified differences (at operation 176). Satcom network 20 may identify (e.g., calculate, compute, determine, measure, detect, generate, etc.) statistical trends in the differences over time. If desired, satcom network 20 may accumulate the differences associated with forward link signals received by multiple (e.g., each) monitoring device 40 in communications system 38 over time (e.g., may identify statistical trends across two or more monitoring devices 40 over time). Satcom network 20 may compare the identified difference(s) produced by the forward link signals FWDSIG received by monitoring device 40 over any desired time period (e.g., from one or more received forward link packets) and/or produced by forward link signals received by any additional monitoring devices 40 over any desired time period, and/or statistical information associated with these difference(s) to one or more threshold values (e.g., at operation 108 of FIG. 6). When the identified difference(s) and/or the statistical information exceeds one of the threshold values (or falls outside a predetermined range of difference values bound by two or more threshold values), processing may proceed to operation 116 of FIG. 6. Otherwise, processing may proceed to operation 112 of FIG. 6. The comparisons of operation 176 may act either immediately or over time depending on statistical trends in the measurements (e.g., allowing satcom network region 20 to respond near real time to issues or errors, or in response to trends over time).

Figure 11:
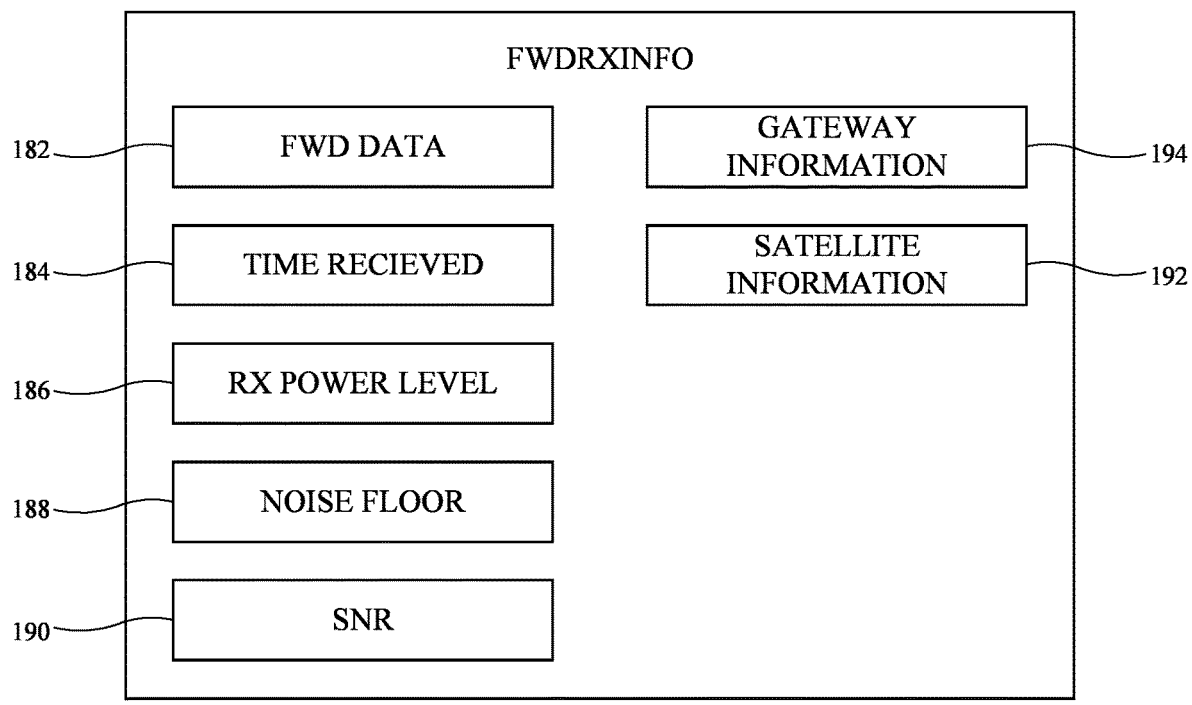
FIG. 11 is a diagram of illustrative forward link signal information that may be transmitted by a network performance monitoring device to a satcom network region while monitoring network performance in accordance with some embodiments.

FIG. 11 is a diagram showing examples of information that may be included in the forward link signal information FWDRXINFO. This information may be included in forward link signal information FWDRXINFO upon generation of forward link signal information FWDRXINFO by monitoring device 40 in response to receiving forward link signals FWDSIG and transmitted to satcom network region 20 (e.g., while processing operation 140 of FIG. 7). Satcom network region may identify this information while processing forward link signal information FWDRXINFO received from monitoring device 40.

As shown in FIG. 11, forward link signal information FWDRXINFO may include the forward (FWD) link data 182. Forward link data 182 may include the forward link data (e.g., forward link data packets or payloads) from forward link signals FWDSIG (e.g., as transmitted by gateway 14). Additionally or alternatively, forward link signal information FWDRXINFO may include timing information such as receive times 184. Receive times 184 may identify the time(s) at which forward link signals FWDSIG were received at monitoring device 40.

If desired, forward link signal information FWDRXINFO may include wireless performance metric data such as a receive (RX) power levels 186, noise floor values 188, and/or SNR values 190. Receive power levels 186 may indicate the power levels with which monitoring device 40 received forward link signals FWDSIG. Noise floor values 188 may identify noise floor levels of the received forward link signals FWDSIG. SNR values 190 may identify signal-to-noise ratios of the received forward link signals FWDSIG. Received power levels 186, noise floor values 188, and SNR values 190 may be generated by sensor circuitry in radio-frequency circuitry 74 and/or may be generated by SDR 76 of FIG. 4, for example. Forward link signal information FWDRXINFO may include values of any desired wireless performance metrics as measured by monitoring device 40 and/or may include information identifying the frequency at which forward link signals FWDSIG were received. As other examples, forward link signal information FWDRXINFO may include latency to the receiving device by virtue of a slot transmitting device and/or the RF channel used for transmission.

Additionally or alternatively, forward link signal information FWDRXINFO may include gateway information 192 and/or satellite information 194. Gateway information 192 may identify the gateway 14 that transmitted forward link signals FWDSIG. Gateway information 192 may also identify other parameters associated with the transmission of forward link signals FWDSIG by gateway 14 such as information identifying the transmit power level of forward link signals FWDSIG, a transmit duty cycle of forward link signals FWDSIG, a transmit frequency of forward link signals FWDSIG, information identifying which antenna(s) on gateway 14 transmitted forward link signals FWDSIG, information identifying which signal beam (e.g., a signal beam having a corresponding beam pointing direction) of the antenna(s) was used to transmit forward link signals FWDSIG, etc.

Satellite information 194 may identify the satellite(s) 12 in satellite constellation 32 that transmitted forward link signals FWDSIG to monitoring device 40. Satellite information 194 may also identify other parameters associated with the transmission of forward link signals FWDSIG by satellite(s) 12 such as information identifying which antenna(s) on satellite(s) 12 transmitted forward link signals FWDSIG, information identifying which signal beam(s) of the antenna(s) were used to transmit forward link signals FWDSIG, information identifying the position (e.g., orbit information, elevation information, altitude information, inclination information, eccentricity information, orbital period information, trajectory information, right ascension information, declination information, ground track information, etc.) and/or the velocity of the satellite(s) 12 when the satellite(s) 12 transmitted forward link signals FWDSIG, etc.

Some or all of gateway information 192 and/or satellite information 194 may be appended to forward link signals FWDSIG upon transmission of the forward link signals by gateway 14 and/or satellite constellation 32 (e.g., in one or more header fields, a payload field, etc.) and/or upon receipt of the forward link signals by monitoring device 40. Additionally or alternatively, some or all of gateway information 192 and/or satellite information 194 may be predetermined, known to, or deduced by satcom network region 20 based on the timing of the transmission and/or reception of forward link signals FWDSIG in conjunction with the communication schedule governing wireless communications using gateway 14 and satellite constellation 32. The communication schedule may be generated by or otherwise known to satcom network region 20 itself.

As an example, satcom network region 20 may generate a communications schedule for use in providing communications services for UE device(s) 10 using satellite constellation 32 and gateway(s) 14. The communications schedule assigns the radio-frequency resources of gateway(s) 14 and satellite constellation 32 (e.g., time resources, frequency resources, different antennas, different signal beams, etc.) to different UE device(s) 10 that are to provided with communications capacity via satellite constellation 32. Satcom network region 20 may provide the communications schedule to gateway(s) 14 or may otherwise control wireless data transfer by gateway(s) 14 in based on the communications schedule. Gateway(s) 14 may transmit forward link signals, UE device(s) 10 may transmit reverse link signals, and satellite constellation 32 may route the forward and reverse link signals within different signal beams in accordance with the communications schedule generated by satcom network region 20. Satcom network region 20 therefore has a priori knowledge of which gateway(s) 14, which antennas and signal beams of gateway(s) 14, which satellite(s) 12, and/or which antennas and signal beams of satellite(s) 12 were used to transmit the forward link signals FWDSIG received by monitoring device 40. The position of each of the monitoring devices 40 are also known to satcom network region 20 (e.g., because satcom network region 20 manages or operates monitoring devices 40). Further, the position and/or velocity of each of the satellites 12 in satellite constellation 32 are known to satcom network region 20 and monitoring device 40 at all points in time (e.g., based on satellite information such as a satellite almanac received from NOC 16). If desired, monitoring device 40 may generate satellite information 194 in forward link signal information FWDRXINFO identifying the position of the satellite(s) 12 that transmitted the received forward link signals FWDSIG based on the time(s) at which the forward link signals are received at monitoring device 40 (since monitoring device 40 has knowledge of the position and velocity of satellites 12 at all times).

Satcom network region 20 may use some or all of this information to predict one or more properties of the forward link signals FWDSIG that are to be received at monitoring device 40 at the time(s) when monitoring device 40 receives forward link signals FWDSIG. Satcom network region 20 may then compare some or all of this information as predicted to some or all of this information as generated by monitoring device 40 based on the forward link signals FWDSIG that were actually received at monitoring device 40 to identify differences between the predicted information and the actual information (e.g., while processing operation 174 of FIG. 1) If excessive differences between the predicted and actual information are present, this may be indicative of the presence of one or more errors, problems, or other non-idealities in satellite constellation 32 and/or gateway(s) 14 that limit, deteriorate, or otherwise impact the performance of communications system 38 in conveying wireless data between gateway(s) 14 and UE device(s) 10 via satellite constellation 32.

Consider one example in which a first satellite 12 is scheduled to route forward link signals FWDSIG from a first gateway 14 to a geographic region that includes monitoring device at a first time (e.g., according to the communications schedule generated by or known to satcom network region 20). Satcom network region 20 may have knowledge of the position, velocity, and power of the first satellite in the sky and relative to monitoring device 40 at the first time (e.g., from the satellite almanac and the known position of monitoring device 40). Satcom network region 20 may predict (calculate) that for a satellite at the position and velocity of the first satellite, forward link signals transmitted by the first satellite at the scheduled first time will arrive at the known location of monitoring device 40 on Earth at a second time subsequent to the first time. Satcom network region 20 may additionally or alternatively predict (calculate), based on the known position, velocity, and power of the first satellite and monitoring device 40, the power level, SNR, or other properties (characteristics or wireless performance metrics) of the forward link signals FWDSIG as received by monitoring device 40 at the second time. This calculation may, for example, account for free space loss between the position of the first satellite and monitoring device 40, atmospheric loss between position of the first satellite and monitoring device 40, the transmit power level of the first satellite, etc. Satcom network region may, for example, perform these predictions while processing operation 102 of FIG. 6.

The first satellite 12 may then actually transmit (route) the scheduled forward link signals FWDSIG to the geographic region that includes monitoring device 40 at the first time. Monitoring device 40 may receive forward link signals FWDSIG at a third time. The third time may be the same as the second time or may be different from the second time. Monitoring device 40 may generate (e.g., measure, identify, calculate, compute, sense, etc.) information about the received forward link signals FWDSIG such as the time at which the signals were received (e.g., the third time), the actual received power level, the actual SNR, or other properties (e.g., wireless performance metric data) associated with the received signals (e.g., at operation 138 of FIG. 7). Monitoring device 40 may include this information in forward link signal information FWDRXSIG and may transmit forward link signal information FWDRXSIG to satcom network region 20 (e.g., at operation 140 of FIG. 7). Satcom network region 20 may compare this information in forward link signal information FWDRXSIG to the predicted information (e.g., at operation 174 of FIG. 10 and operation 108 of FIG. 6) to identify one or more differences between the properties of the forward link signals that monitoring device 40 was predicted to receive (e.g., at operation 102 of FIG. 6) and the properties of the forward link signals that monitoring device 40 actually received (e.g., at operation 136 of FIG. 7). Similar comparisons may be made between the transmitted and received reverse link signal information (e.g., REVTXINFO and REVRXINFO) to detect one or more errors, problems, or other non-idealities in satellite constellation 32 and/or gateway(s) 14 that limit, deteriorate, or otherwise impact the performance of communications system 38 in conveying wireless data between gateway(s) 14 and UE device(s) 10 via satellite constellation 32 (e.g., while processing operations 164-168 of FIG. 9). If the difference(s) exceed a threshold value (e.g., if the differences are excessively large), satcom network region 20 may generate and transmit error information ERRORINFO (e.g., at operation 116 of FIG. 6). If the difference(s) are less than the threshold value (e.g., if the differences are sufficiently small), satcom region 20 may forego transmission of error information ERRORINFO (e.g., at operation 112 of FIG. 6).

Figure 12:
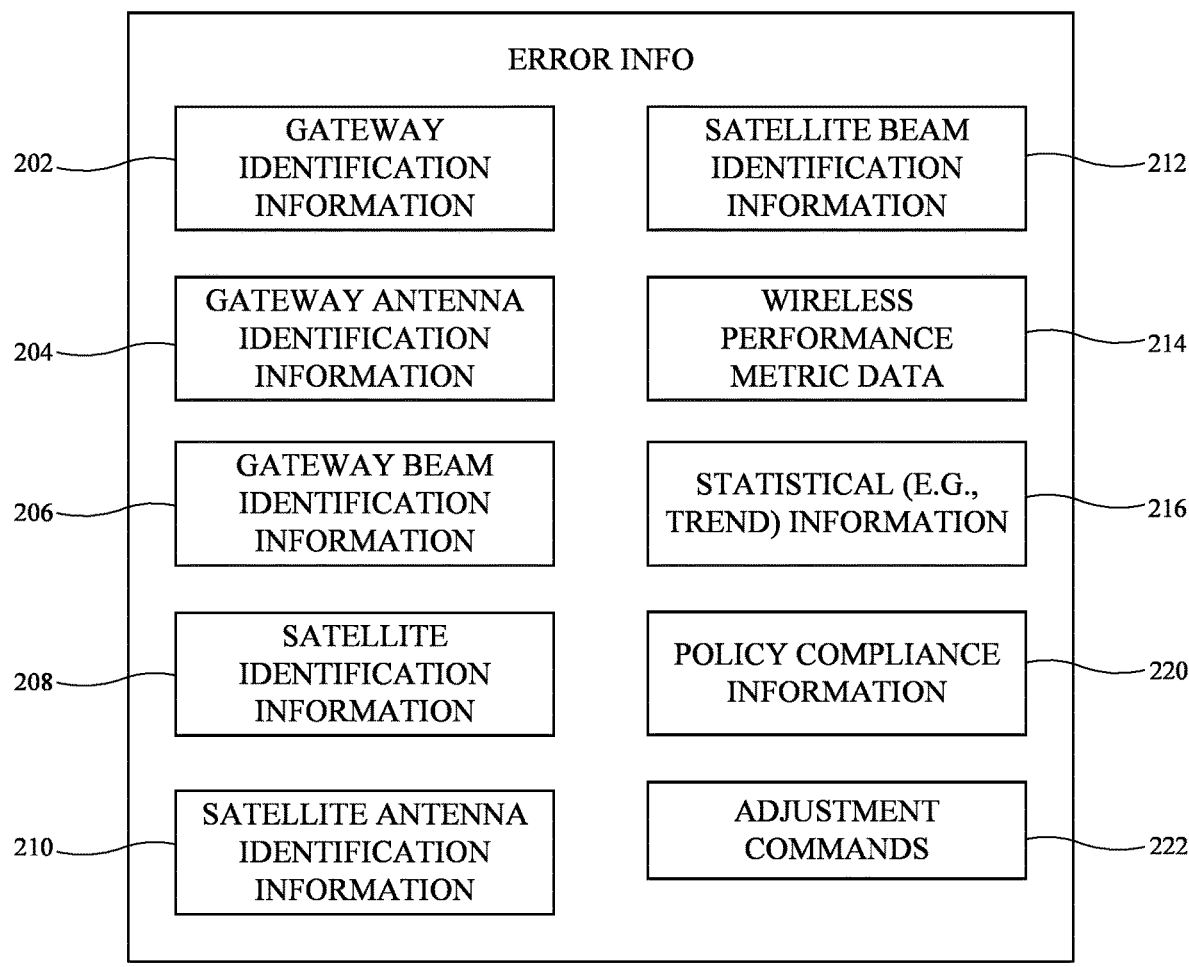
FIG. 12 is a diagram of illustrative error information that may be generated by a satcom network region while monitoring network performance in accordance with some embodiments.

FIG. 12 is a diagram showing examples of information that may be included in the error information ERRORINFO that may be generated by satcom network region 20 (e.g., while processing operation 116 of FIG. 6). In general, error information ERRORINFO may include information identifying one or more errors, problems, or other non-idealities in satellite constellation 32 and/or gateway(s) 14 that limit, deteriorate, or otherwise impact the performance of communications system 38 in conveying wireless data between gateway(s) 14 and UE device(s) 10 via satellite constellation 32. The information may include information identifying one or more points in and/or between monitoring device 40, satellite constellation 32, and gateway(s) 14 that generated, were likely to have generated, or are otherwise associated with the identified one or more errors, problems, or other non-idealities in satellite constellation 32 and/or gateway(s) 14 that limit, deteriorate, or otherwise impact the performance of communications system 38 in conveying wireless data between gateway(s) 14 and UE device(s) 10 via satellite constellation 32.

For example, error information ERRORINFO may indicate or identify that a first antenna X1 on a first gateway 14 has lost Y % of its reverse link packets within a time period Z. As another example, error information ERRORINFO may indicate or identify that a second antenna X2 on a second gateway 14 has been down or inactive for a period of W minutes. As yet another example, error information ERRORINFO may indicate or identify that a third signal beam of a fifth satellite 12 has produced an excessive amount of signal loss (e.g., insufficient SNR at monitoring device 40) over a period of T months in conveying forward link signals within its footprint on Earth. These are just examples of the types of information that may be conveyed in error information ERRORINFO. This information may, for example, be used by an operator, technician, administrator, or service provider of gateway(s) 14, satellite constellation 32, and/or NOC 16 to identify, diagnose, or debug errors, problems, or non-idealities in gateway(s) 14 and/or satellite constellation 32 that arise over time.

Satcom network region 20 may identify any desired errors, problems, or non-idealities in gateway(s) 14 and/or satellite constellation 32 in providing wireless communications capacity to UE device(s) 10 using monitoring device 40. These errors, problems, or non-idealities may be explicitly identified or indicated in error information ERROR-INFO or may be deduced by an operator, technician, administrator, or service provider of gateway(s) 14, satellite constellation 32, and/or NOC 16 based on error information ERRORINFO. These errors, problems, or non-idealities may include, as examples, antenna failures on gateway(s) 14, antenna failures or unavailability on satellite(s) 12, timing errors or errors where part of the software running on gateway(s) 14 does not send a scheduled message, power outages or undesirably low power levels at gateway(s) 14, power errors on satellite(s) 12 (e.g., power failures, undesirably low power levels, undesirable power spikes, etc.), software on gateway(s) 14 being configured with an incorrect data rate, software stack protocol changes, signal power drops exceeding a predetermined margin (e.g., where all gateway(s) 14 in a given region suffer a signal power loss of X dB), a congested network state (e.g., when there is an excessively heavy load on satellite constellation 32 or an excessive number of UE devices 10 attempting to communicate via satellite constellation 32), a UE device 10 on Earth that produces undesirable signal interference, excessive delays, errors associated with system saturation, errors in one or more components of the terrestrial network, errors in one or more components of satcom network 20, errors associated with monitoring device 40 expecting to receive a signal or data and then not receiving the signal or data, an error where satcom network region 20 did not see a network node transmit data that was received, an error where a node transmitted data on the MAC layer but not on the PHY layer, an error where a node did not transmit data because there was no available antenna but there should have been one (e.g., across all gateways 14), an error where data is lost in the air, etc.

More generally, as shown in FIG. 12, error information ERRORINFO may include gateway identification information 202. Gateway identification information 202 may include information identifying which gateway(s) 14 in communications system 38 transmitted the forward link signals FWDSIG and/or received the reverse link signals REVSIG associated with the identified difference(s) that exceeded the threshold value(s) (e.g., the gateway(s) 14 that produced or are statistically likely to have produced the identified errors, problems, or other non-idealities). If desired, error information ERRORINFO may also include gateway antenna identification information 204. Gateway antenna identification information 204 may include information identifying which antenna(s) on the gateway(s) 14 identified by gateway identification information 202 transmitted the forward link signals FWDSIG and/or received the reverse link signals REVSIG associated with the identified difference(s) that exceeded the threshold value(s) (e.g., the particular antenna(s) on gateway(s) 14 that produced or are statistically likely to have produced the identified errors, problems, or other non-idealities). If desired, error information ERRORINFO may also include gateway beam identification information 208. Gateway beam identification information 208 may include information identifying which signal beams(s) of the antenna(s) identified by gateway antenna identification information 204 transmitted the forward link signals FWDSIG and/or received the reverse link signals REVSIG associated with the identified difference(s) that exceeded the threshold value(s) (e.g., the particular signal beam(s) of the antenna(s) on gateway(s) 14 that produced or are statistically likely to have produced the identified errors, problems, or other non-idealities). The signal beams may be identified by corresponding beam indices (e.g., as stored on codebook(s) for gateway(s) 14).

Each signal beam corresponds to a respective set of phase and magnitude settings for the antennas that causes the antennas to transmit/receive radio-frequency signals in a corresponding beam pointing direction (e.g., a direction of peak signal gain).

Additionally or alternatively, error information ERRORINFO may include satellite identification information 208. Satellite information 208 may include information identifying which satellite(s) 12 in satellite constellation 12 conveyed the forward link signals FWDSIG and/or the reverse link signals REVSIG associated with the identified difference(s) that exceeded the threshold value(s) (e.g., the satellites(s) 12 that produced or are statistically likely to have produced the identified errors, problems, or other non-idealities). If desired, error information ERRORINFO may also include satellite antenna identification information 210. Satellite antenna identification information 210 may include information identifying which antenna(s) 62 (FIG. 3) on the satellite(s) 12 identified by satellite identification information 208 conveyed the forward link signals FWDSIG and/or the reverse link signals REVSIG associated with the identified difference(s) that exceeded the threshold value(s) (e.g., the particular antenna(s) 62 on satellite(s) 12 that produced or are statistically likely to have produced the identified errors, problems, or other non-idealities). If desired, error information ERRORINFO may also include satellite beam identification information 212. Satellite beam identification information 212 may include information identifying which signal beams(s) of the antenna(s) identified by satellite antenna identification information 210 conveyed the forward link signals FWDSIG and/or the reverse link signals REVSIG associated with the identified difference(s) that exceeded the threshold value(s) (e.g., the particular signal beam(s) of the antenna(s) on satellite(s) 12 that produced or are statistically likely to have produced the identified errors, problems, or other non-idealities). The signal beams may be identified by corresponding beam indices (e.g., as stored on codebook(s) for satellite(s) 12).

Additionally or alternatively, error information ERRORINFO may include wireless performance metric data 214. Wireless performance metric data 214 may include wireless performance metric data gathered by monitoring device 40 (e.g., as included in reverse link signal information REVTXINFO and/or forward link signal information FWDRXINFO) and/or gathered by gateway(s) 14 (e.g., as included in reverse link signal information REVRXINFO).

Additionally or alternatively, error information ERRORINFO may include statistical (trend) information 216. Statistical information 216 may include or identify one or more trends in the wireless performance metric data gathered by monitoring device 40 and/or gateway 14, the identified differences, and/or the identified errors, problems, or other non-idealities as gathered using forward link signals FWDSIG received by and/or reverse link signals REVSIG transmitted by one or more (e.g., all) monitoring devices 40 in communications system 38 over any desired time period (e.g., a single instance, a few seconds, a few minutes, a few hours, a few days, a few weeks, a few months, etc.).

Additionally or alternatively, error information ERRORINFO may include policy compliance information 220. Policy compliance information 220 may identify one or more policies (e.g., SLAs) between the service provider associated with satcom network region 20 and the service provider associated with NOC 16, satellite constellation 32, and/or gateway(s) 14. If desired, policy compliance information 220 may include information identifying if and how the wireless communications capacity provided to UE device(s) 10 via satellite constellation 32 and gateway(s) 14 does or does not comply with the one or more policies.

Additionally or alternatively, error information ERROR-INFO may include one or more adjustment commands 222. Adjustment commands 222 may instruct gateway(s) 14, NOC 16, and/or satellite constellation 32 to alter how communications are performed. If desired, adjustment commands 222 may instruct gateway(s) 14, NOC 16, and/or satellite constellation 32 on how to alter communications (e.g., in a manner that alleviates or mitigates the identified errors, non-idealities, or other network performance issues).

The example of FIG. 12 is illustrative and non-limiting. Error information ERRORINFO may sometimes also be referred to herein as an error report, monitoring report, compliance report, network performance report, audit report, or error signal. One or more of elements 202-222 may be omitted from error information ERRORINFO if desired. Error information ERRORINFO may include any other desired information associated with the performance of satellite constellation 32 and gateway(s) 14 in conveying wireless data for UE device(s) 10. Additional examples of such information that may be included in error information ERRORINFO includes information identifying a polarization of the forward or reverse link signals associated with the identified error (e.g., a left-hand or right-hand circular polarization), information identifying a particular server or software on the server associated with the identified error, information identifying a modem or modem link associated with the error, etc.

Satcom network region 20 may generate some or all of the information in error information ERRORINFO based on reverse link signal information REVTXINFO, reverse link signal information REVRXINFO, forward link signal information FWDRXINFO, the communications schedule generated by satcom network region 20 for UE device(s) 10, satellite constellation 32, and gateway(s) 14, and/or the known positions and velocities of the satellites 12 in satellite constellation 32 (e.g., while processing operation 116 of FIG. 6). Satcom network region 20 may transmit error information ERRORINFO to gateway(s) 14, NOC 16, satellite constellation 32, and/or an operator of, administrator of, technician of, or other entity associated with gateway(s) 14, NOC 16, and/or satellite constellation 32.

Gateway(s) 14, NOC 16, satellite constellation 32, and/or the operator, administrator, or technician of gateway(s) 14, NOC 16, and/or satellite constellation 32 may use some or all of the information in error information ERRORINFO to diagnose, debug, and/or repair the one or more errors, problems, or non-idealities identified by satcom network region 20 (e.g., to mitigate the identified difference(s) and to optimize the performance of gateway(s) 14 and satellite constellation 32 in conveying wireless data for UE device(s) 10). For example, information 202-212 may pinpoint where in the communications chain between gateway 14 and monitoring device 40 there is an error, problem, or non-ideality that limits radio-frequency performance, wireless performance metric data 214 may identify the error or the severity of the error, statistical information 216 may identify how long the error has occurred (e.g., errors that occur for longer times may be more severe than errors that occur for shorter times), etc. Additionally or alternatively, adjustment commands 222 may provide instructions on how to adjust operations to mitigate the errors.

Figure 13:
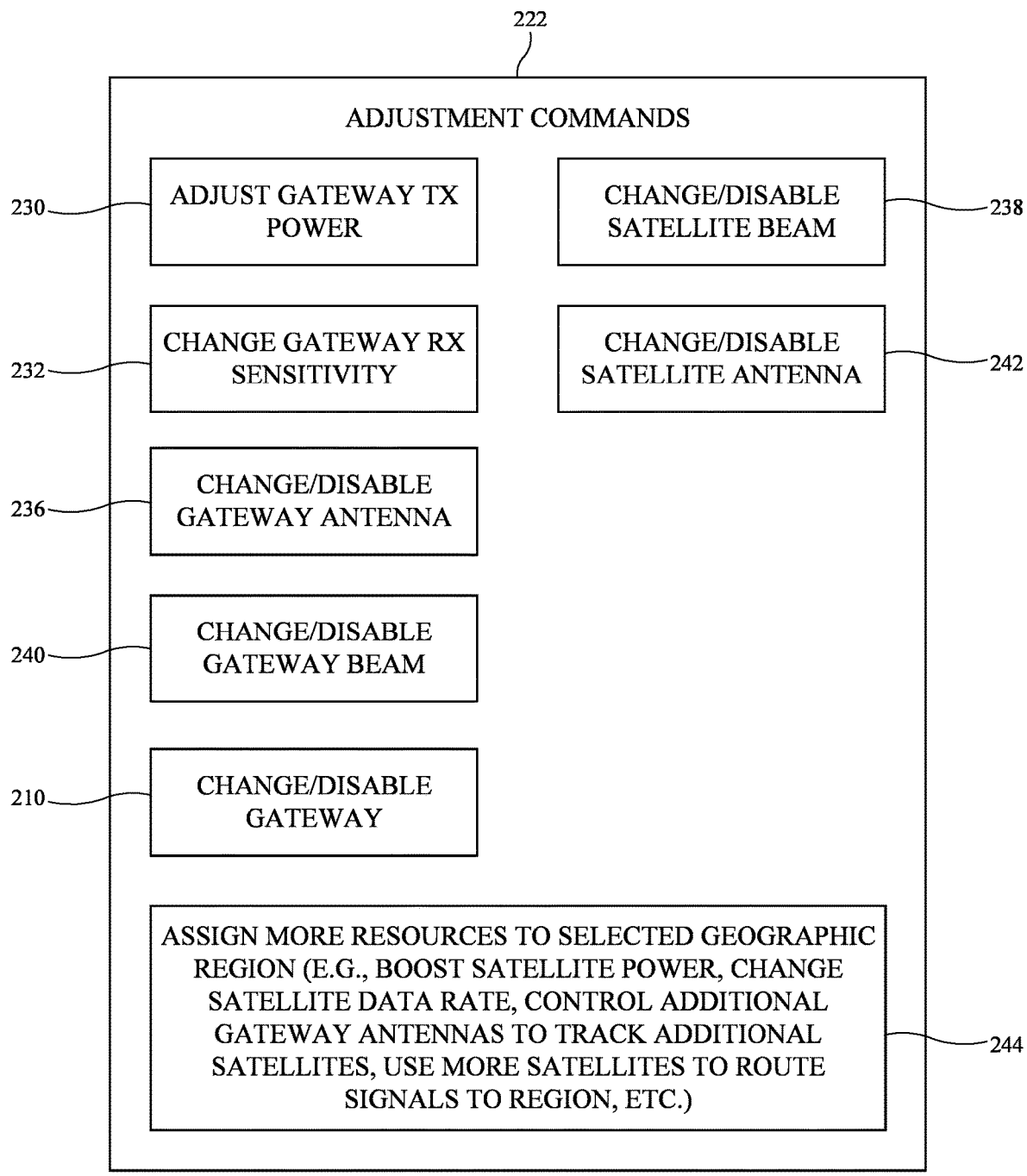
FIG. 13 is a diagram of illustrative network adjustment commands that may be included in error information generated by a satcom network region while monitoring network performance in accordance with some embodiments.

FIG. 13 is a diagram showing examples of adjustment commands 222 that may be included in error information ERRORINFO to help mitigate errors, problems, or other non-idealities in satellite constellation 32 and/or gateway(s) 14 that limit, deteriorate, or otherwise impact the performance of communications system 38 in conveying wireless data between gateway(s) 14 and UE device(s) 10 via satellite constellation 32.

As shown in FIG. 13, adjustment commands 222 (sometimes referred to herein as commands 222, adjustments 222, or control signals 222) may include an adjustment (change) 230 to the transmit power level of gateway(s) 14. Adjustment 230 may, for example, control gateway 14 (e.g., the gateway identified by gateway identification information 202 of FIG. 12) to adjust (e.g., increase) transmit power level to help boost the performance of UE device(s) 10 in receiving forward link signals.

Additionally or alternatively, adjustment commands 222 may include an adjustment (change) 232 to the receiver sensitivity of gateway(s) 14. Adjustment 232 may, for example, control gateway 14 (e.g., the gateway identified by gateway identification information 202 of FIG. 12) to adjust (e.g., increase) its receiver sensitivity to help boost the performance of the gateway in receiving reverse link signals transmitted by UE device(s) 10.

Additionally or alternatively, adjustment commands 222 may include an adjustment (change) 234 to the active antenna(s) of gateway(s) 14. Adjustment 234 may, for example, control gateway 14 to disable a faulty antenna (e.g., an antenna that transmitted forward link signals FWDSIG or received reverse link signals REVSIG that produced excessive differences as identified by satcom network region at operation 108 of FIG. 6) and/or to switch a different or better-performing antenna into use.

Additionally or alternatively, adjustment commands 222 may include an adjustment (change) 236 to the active signal beam(s) of gateway(s) 14. Adjustment 236 may, for example, control gateway 14 to disable a poorly-performing signal beam (e.g., a signal beam that transmitted forward link signals FWDSIG or received reverse link signals REVSIG that produced excessive differences as identified by satcom network region at operation 108 of FIG. 6) and/or to switch a different or better-performing signal beam into use.

Additionally or alternatively, adjustment commands 222 may include an adjustment (change) 240 to the active gateway(s) 14. Adjustment 240 may, for example, disable a faulty or poorly-performing gateway 14 from continuing to route wireless data for UE device(s) 10 (e.g., a gateway 14 that transmitted forward link signals FWDSIG or received reverse link signals REVSIG that produced excessive differences as identified by satcom network region at operation 108 of FIG. 6). If desired, adjustment 240 may serve to switch a different or better-performing gateway 14 into use.

Additionally or alternatively, adjustment commands 222 may include an adjustment (change) 238 to the active signal beam(s) of satellite(s) 12. Adjustment 236 may, for example, control gateway(s) 14 to instruct satellite(s) 12 to disable a poorly-performing signal beam (e.g., a signal beam that conveyed forward link signals FWDSIG or reverse link signals REVSIG that produced excessive differences as identified by satcom network region at operation 108 of FIG. 6) and/or to switch a different or better-performing signal beam into use.

Additionally or alternatively, adjustment commands 222 may include an adjustment (change) 242 to the active satellite(s) 12. Adjustment 242 may, for example, control gateway(s) 14 to disable a poorly-performing satellite 12 from continuing to route wireless data for UE device(s) 10 (e.g., a satellite 12 that conveyed forward link signals FWDSIG or reverse link signals REVSIG that produced excessive differences as identified by satcom network region at operation 108 of FIG. 6) and/or to switch a different or better-performing satellite 12 into use.

If desired, adjustment commands 222 may include adjustments to the power level(s) of satellite(s) 12. In some examples, adjustment commands 222 may include an assignment 244 of more communications resources to a selected geographic region. The selected geographic region may be a region having poor performance (e.g., as measured by a monitoring device 40 in that region). The selected region may, for example, be a region having an unexpected heavy traffic load. The unexpected heavy traffic load may, for example, occur when a relatively or unusually large number of UE devices 10 attempt to communicate via satellite constellation 32 rather than via the terrestrial network. The unexpected heavy traffic load may exceed the communications capacity currently being provided by satellite constellation 32 in the geographic area, may strain the resources of satellite constellation 32, may create traffic bottlenecks via satellite constellation 32, and/or may cause satellite constellation 32 to exhibit poor performance in conveying wireless data. This may occur, for example, when the geographic region is subjected to a power outage, government action, natural disaster, or other event that blocks or prevents UE devices 10 from being able to access network portion 18 via terrestrial-based wireless communications equipment 22 (FIG. 1).

When such an unexpected heavy traffic load occurs, assignment 244 may allocate more space-based communications resources to the geographic region to help meet demand. This may include, for example, assigning more satellites 12 to serve the geographic region, assigning satellites 12 to direct more signal beams towards the geographic region, controlling the satellites 12 to increase dwell time in the geographic region, controlling the satellites 12 to boost power levels, changing which satellites 12 serve the geographic region (e.g., assigning satellites in different or additional types of orbits to serve the geographic region, assigning satellites with more resources or capacity to the geographic region, repositioning or orienting the satellites, etc.), increasing the transmit power level and/or receiver sensitivity of the gateway(s) 14 that serve the geographic region, changing the data rate with which satellites 12 serve the geographic region (e.g., reducing the data rate so the satellites transmit in shorter bursts that allow the satellite to serve a greater number of users), activating and using some or all standby antennas on gateway(s) 14 that serve the geographic region (e.g., to track additional satellites 12 covering the geographic area to boost reverse link message throughput), etc. The example of FIG. 13 is merely illustrative. One or more of adjustments 230-244 may be omitted. In general, adjustment commands 222 may include any desired adjustments to gateway(s) 14 and/or satellite constellation 32.

In general, monitoring device 40 does not act as a UE device 10 in communications system 38 (e.g., does not perform the same full stack end-to-end communications as a UE device) and is not operated by an end user (e.g., monitoring device 40 is instead operated by satcom network region 20 or an operator of satcom network region 20). Monitoring device 40 may, for example, transmit UL signals at significantly higher power levels (gain) than a UE device 10 (e.g., for stress-testing the network, whereas a UE device need only communicate via the network). If desired, a UE device 10 may be configured to perform one or more (e.g., all) of the operations of monitoring device 40 as described herein (e.g., in addition to being operated by an end user and performing the full stack end-to-end communications of a UE device).

One or more elements described herein (e.g., UE devices 10, network performance monitoring devices 40, satcom network region 20, etc.) may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. A method of operating one or more nodes in a communications network having an electronic device, a gateway, and a communications satellite, the method comprising:
   receiving, from the electronic device, forward link signal information associated with forward link signals received by the electronic device from the communications satellite, the forward link signals being transmitted by the gateway;
   with one or more processors, predicting a property of the forward link signals as received at the electronic device; and
   transmitting error information based on a difference between the predicted property of the forward link signals and the forward link signal information received from the electronic device.

2. The method of claim 1, wherein predicting the property of the forward link signals comprises predicting the property based on a position of the communications satellite, a power level of the communications satellite, and a position of the electronic device.

3. The method of claim 2, wherein the predicted property comprises a predicted wireless performance metric data value, the forward link signal information comprising a wireless performance metric data value obtained by the electronic device based on the forward link signals.

4. The method of claim 2, wherein the predicted property comprises a time at which the electronic device is predicted to receive the forward link signals, the forward link signal information comprising a time at which the electronic device actually received the forward link signals.

5. The method of claim 2, further comprising:
   with the one or more processors, generating a communications schedule that assigns a forward link grant to the gateway, wherein predicting the property comprises predicting the property based on the communications schedule.

6. The method of claim 1, wherein the error information includes information identifying a point on the communications satellite that is associated with the difference between the predicted property of the forward link signals and the forward link signal information.

7. The method of claim 1, wherein the error information includes information identifying a point on the gateway that is associated with the difference between the predicted property of the forward link signals and the forward link signal information.

8. The method of claim 1, wherein the error information includes a command to adjust one or more components on the gateway or the communications satellite.

9. The method of claim 8, wherein the command comprises a command to increase communications resources provided to a geographic region in which the electronic device is located.

10. The method of claim 1, wherein transmitting the error information comprises transmitting the error information when the difference exceeds a threshold value.

11. The method of claim 1, wherein receiving the forward link signal information comprises receiving the forward link signal information via a terrestrial network.

12. The method of claim 1, further comprising:
receiving, from the electronic device, first reverse link signal information associated with reverse link data transmitted to the communications satellite by the electronic device;
receiving, from the gateway, second reverse link signal information associated with the reverse link data received at the gateway from the communications satellite; and
transmitting additional error information based on an additional difference between the first reverse link signal information and the second reverse link signal information.

13. The method of claim 12, further comprising:
directing, towards an end host of the communications network, additional reverse link data from the second reverse link signal information, the additional reverse link data being transmitted by a user equipment device that is different from the electronic device; and
identifying the reverse link data transmitted by the electronic device based on an identifier associated with the electronic device, wherein the additional difference comprises a difference between the reverse link data transmitted by the electronic device and the first reverse link signal information.

14. The method of claim 12, wherein the first reverse link signal information comprises first wireless performance metric data generated by the electronic device based on transmission of the reverse link data by the electronic device, the second reverse link signal information comprises second wireless performance metric data generated by the gateway based on reception of the reverse link data by the gateway, and the additional difference comprises a difference between the first wireless performance metric data and the second wireless performance metric data.

15. The method of claim 12, wherein the additional error information includes information identifying a point on the communications satellite or the gateway that is associated with the additional difference between the first reverse link signal information and the second reverse link signal information.

16. The method of claim 1, further comprising:
adjusting a constellation that includes the communications satellite based on the difference between the predicted property of the forward link signals and the forward link signal information received from the electronic device.

17. The method of claim 16, wherein adjusting the constellation comprises changing a communications satellite in the constellation that is used to serve a user equipment device that is different from the electronic device.

18. The method of claim 16, wherein adjusting the constellation comprises changing an active signal beam, a data rate, or a power level of at least one communications satellite in the constellation.

19. A network comprising:
one or more nodes configured to receive, from an electronic device, forward link signal information associated with forward link signals received by the electronic device from a communications satellite, the forward link signals being transmitted by a gateway; and
one or more processors configured to
predict a property of the forward link signals as received at the electronic device, and
transmit error information based on a difference between the predicted property of the forward link signals and the forward link signal information received from the electronic device.

20. A communications system comprising:
a gateway configured to transmit forward link signals;
a satellite configured to transmit the forward link signals transmitted by the gateway;
a server configured to receive, from an electronic device, forward link signal information associated with the forward link signals as received by the electronic device from the satellite; and
one or more processors configured to
predict a property of the forward link signals as received at the electronic device, and
transmit error information based on a difference between the predicted property of the forward link signals and the forward link signal information received from the electronic device.

* * * * *